United States Patent
Lin et al.

(10) Patent No.: US 10,679,118 B2
(45) Date of Patent: Jun. 9, 2020

(54) SOLVING MATRIX INVERSE PROBLEMS USING NEUROMORPHIC COMPUTING

(71) Applicant: Intel Corporation, Santa Clara, CA (US)

(72) Inventors: Tsung-Han Lin, Campbell, CA (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 15/385,504

(22) Filed: Dec. 20, 2016

(65) Prior Publication Data

US 2018/0174024 A1 Jun. 21, 2018

(51) Int. Cl.
| | |
|---|---|
| *G06N 3/04* | (2006.01) |
| *G06F 17/16* | (2006.01) |
| *G06N 3/063* | (2006.01) |
| *G06N 3/08* | (2006.01) |

(52) U.S. Cl.
CPC ............. *G06N 3/049* (2013.01); *G06F 17/16* (2013.01); *G06N 3/0454* (2013.01); *G06N 3/063* (2013.01); *G06N 3/0635* (2013.01); *G06N 3/08* (2013.01)

(58) Field of Classification Search
CPC ........ G06N 3/049; G06N 3/08; G06N 3/0454; G06N 3/063; G06N 3/0635; G06F 17/16
See application file for complete search history.

(56) References Cited

U.S. PATENT DOCUMENTS

| | | | | |
|---|---|---|---|---|
| 2014/0052679 A1* | 2/2014 | Sinyavskiy | .............. | G06N 3/10 706/25 |
| 2014/0143194 A1* | 5/2014 | Yoon | ........................ | G06N 3/08 706/25 |
| 2014/0365417 A1* | 12/2014 | Piekniewski | ............ | G06N 3/02 706/25 |
| 2015/0206048 A1 | 7/2015 | Talathi et al. | | |

OTHER PUBLICATIONS

Wang et al, A neuromorphic implementation of multiple spike-timing synaptic plasticity rules for large-scale neural networks, May 20, 2015, Frontiers in Neuroscience, (Year: 2015).*
Extended European Search Report for Application No. EP17202654.4, dated May 23, 2018, 14 pages.
Giacomo I.,et al., "Neuromorphic Architectures for Spiking Deep Neural Networks," IEEE International Electron Devices Meeting (IEDM), IEEE, Dec. 7, 2015 (4 pages).

(Continued)

*Primary Examiner* — Austin Hicks
(74) *Attorney, Agent, or Firm* — Alliance IP, LLC

(57) ABSTRACT

A spiking neural network (SNN) is defined that includes artificial neurons interconnected by artificial synapses, the SNN defined to correspond to one or more numerical matrices in an equation such that weight values of the synapses correspond to values in the numerical matrices. An input vector is provided to the SNN to correspond to a numerical vector in the equation. A steady state spiking rate is determined for at least a portion of the neurons in the SNN and an approximate result of a matrix inverse problem corresponding to the equation is determined based on values of the steady state spiking rates.

13 Claims, 20 Drawing Sheets

(56) References Cited

OTHER PUBLICATIONS

Phil K., et al., "A Sparse Coding Neural Network ASIC With On-Chip Learning for Feature Extraction and Encoding," IEEE Journal of Solid-State Circuits, Apr. 2015, vol. 50 (4). (10 pages).

Qiao N., et al., "A Reconfigurable on-line Learning Spiking Neuromorphic Processor Comprising 256 Neurons and 128k Synapses," Frontiers in Neuroscience, Apr. 2015, vol. 9, pp. 141. (22 pages).

Rossello J.L., et al., "Hardware Implementation of Stochastic Spiking Neural Networks," International Journal of Neural Systems, Aug. 2012, vol. 22 (4), pp. 1250014 (14 pages).

Shapero, Samuel, et al., "Optimal Sparse Approximation with Integrate and Fire Neurons," International Journal of Neural Systems, vol. 24, No. 5, Aug. 1, 2014 (14 pages).

* cited by examiner find a vector $r$ that $r = A^{-1}y$ find a vector $r$ that $r = C^{-1}BA^{-1}y$ $$I_1 - Wa_1 - I_b = 0$$

$$\implies a_1 = W^{-1}(I_1 - I_b)$$

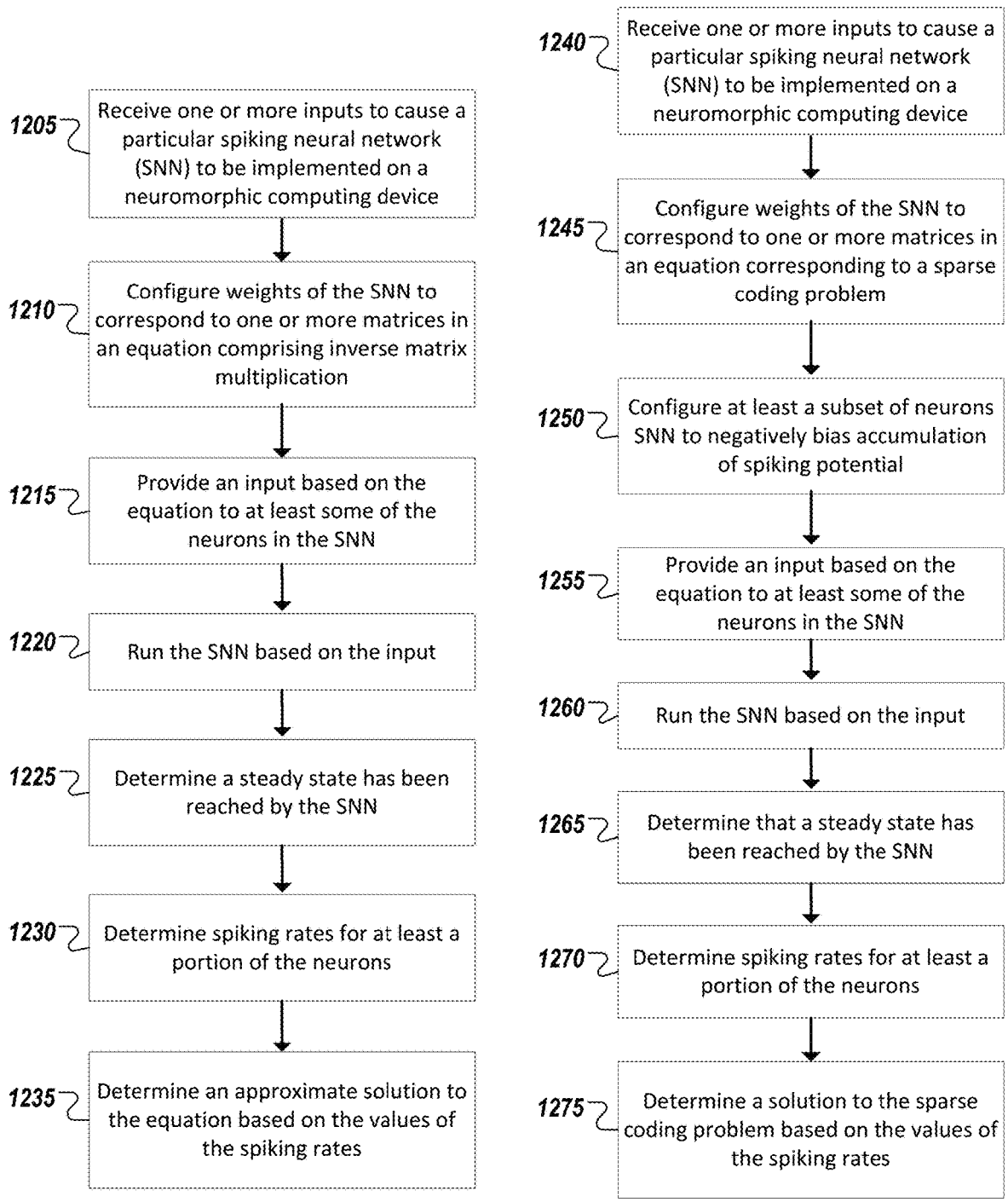

SOLVING MATRIX INVERSE PROBLEMS USING NEUROMORPHIC COMPUTING

TECHNICAL FIELD

This disclosure relates in general to the field of computer systems and, more particularly, to neuromorphic computing.

BACKGROUND

Artificial neural networks (or ANNs) are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs) and Deep Belief Networks (DBNs) are just a few examples of computation paradigms that employ ANN algorithms.

BRIEF DESCRIPTION OF THE DRAWINGS

FIGS. 12A-12C are flowcharts illustrating example techniques involving solving matrix inverse equations utilizing SNNs.

Like reference numbers and designations in the various drawings indicate like elements.

DETAILED DESCRIPTION OF EXAMPLE EMBODIMENTS

Figure 1:
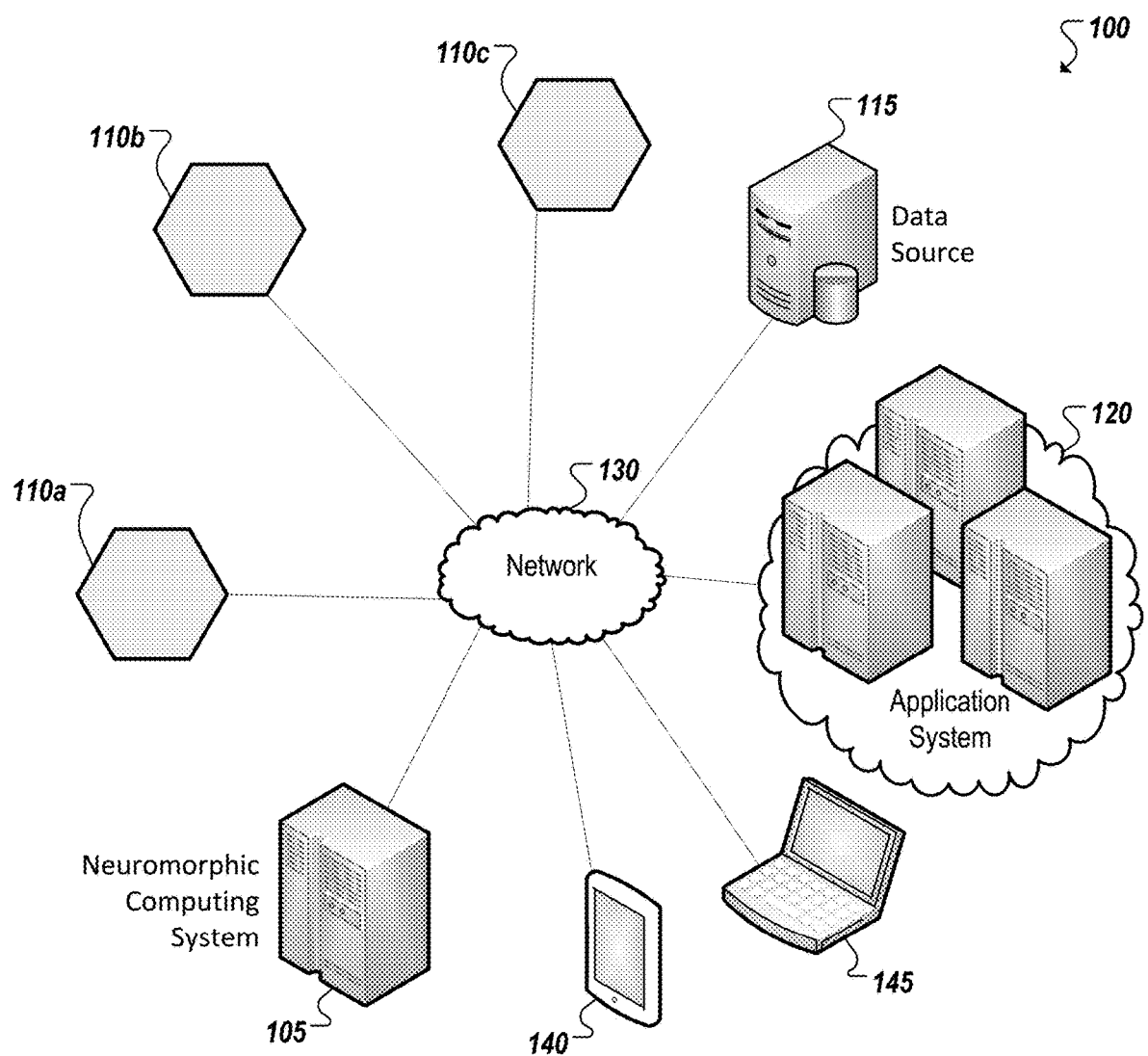
FIG. 1 illustrates an embodiment of a system including a neuromorphic computing systems.

FIG. 1 illustrates an example computing system including a neuromorphic computing system 105, which may accept as inputs, data from one or a variety of sources. For instance, sources may include sensor devices (e.g., 110*a*-*c*). Such devices 110*a*-*c* may detect and/or measure attributes of an environment and generate sensor data describing or capturing characteristics of the environment. For instance, a given sensor may be configured to detect such characteristics as movement, weight, physical contact, temperature, wind, noise, light, computer communications, wireless signals, humidity, the presence of radiation or specific chemical compounds, among several other examples. Sensors may generate numerical data describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110*a*-*c*, 115, etc.) may be provided to the neuromorphic computing system 105 to perform machine and deep learning on the information encapsulated in the data. Results of produced by the neuromorphic computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a neuromorphic computing system 105, such as through the consumption of the results by one or more applications hosted by the user devices (e.g., 140, 145), presenting the results on a graphical user interface of the user device, among other examples.

In some instances, as implied by the example illustrated in FIG. 1, a neuromorphic computing system 105 may be provided as a service (e.g., over a network 130) to one or more other systems (e.g., 120, 140, 145). A neuromorphic computing system 105 may additionally utilize inputs generated by remote systems (e.g., an Internet of Things (IoT) network composed of multiple sensor devices (e.g., 110*a*-*c*). In other instances, the functionality of a neuromorphic computing system 105 may be integrated with any one of the other example systems (e.g., 110*a*-*c*, 115, 120, 130, 140, 145, etc.). For instance, a wearable device or IoT device (e.g., 110*a*-*c*) may be provided with neuromorphic computing resources to operate directly on inputs generated by a sensor of the device. As another example, an application or service may be provided (e.g., by application server system 120), which includes and makes use of neuromorphic computing resources, among a variety of other examples and use cases. Further, neuromorphic computing systems may utilized to support or implement products or services based on or utilizing artificial intelligence, including digital personal assistants, chat bots, video games, self-driving cars, robots, and other examples.

In general, "servers," "clients," "computing devices," "network elements," "hosts," "system-type system entities," "user devices," "sensor devices," and "systems" (e.g., 105, 110a-c, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Neuromorphic computing may involve the use of very-large-scale integration (VLSI) systems containing electronic circuits to mimic neuro-biological architectures present in the nervous system to imbue computing systems with "intelligence". A desirable feature of neuromorphic computing is its ability to autonomously extract high dimensional spatiotemporal features from raw data streams that can reveal the underlying physics of the system being studied thus making them amenable for rapid recognition. Such features may be useful in big data and other large scale computing problems.

Traditional approaches to solving large scale computing problems have relied on experts to extract critical features from the data based on their domain knowledge. Until recently the common approach to address this sort of a problem has been to rely on expert features, these features were then fed to shallow machine learning classifiers such as boosted decision trees for classification. However, due to the high dimensional nature of the data and the absence of any complete analytical model for classification directly from theoretical principles, sometimes that these expert designed features do not capture all of the available information. Moreover, in many cases, there is a lack of sufficient domain knowledge to even attempt such approaches. To address this issue, some solutions have deployed deep machine learning algorithms to directly classify from high dimensional data using low-level features to obviate the need for any domain knowledge. With availability of large amounts of training data as ground truth, as well as with the advent of large scale computing systems with extensive memory and compute power, these algorithms have become a valuable tool for classification and pattern recognition tasks for big data and large scale systems. Such "neurally-inspired" algorithms may be characterized by hierarchical and feedforward organization where the artificial neurons or processing units in lower levels of the hierarchy have small receptive fields that serve as input filters sensitive to low level features. The outputs of these filters may be then fed to the next level, pooling information across several previous level filters. This process is repeated until a classifier is trained to detect objects of interest in the final layer. The salient aspect of such algorithms is that neuronal activity at increasingly higher levels abstracts more general and complex features. The pooling operation is beneficial for extracting features that are often transformation invariant, thus forming a stable internal representation. Such solutions may be successfully applied to challenging problems in machine learning including object recognition and other examples.

While deep learning models (e.g., feed forward neural networks utilizing nonlinear activation functions) may bear resemblance in architecture to their biological counterparts, they have failed to explain recognition in general owing to its inability to generalize well to novel situations with limited training examples. There are many issues with current deep machine learning approaches. For instance, low-level processing determines high-level processing and thus information loss in lower stages is irretrievable. As another example, pooling operations result in seeing wholes at the expense of the parts, as is evident in target-distractor recognition tasks, where both target and distractor features at the lower level are pooled at the higher levels. Such models require millions of examples in order to learn to "average" out distractors, while extracting the most reliable target features. The resulting representation is brittle because the distractor set is virtually infinite, and thus even after a large number of training examples a new distractor can still cause false alarms. Additionally, all units and parameters at all levels of the network are engaged in representing any given input, and are adjusted together during learning.

In some implementations, an improved neuromorphic computing platform may be provided which adopts an energy efficient architecture inspired by the brain that is both scalable and energy efficient while also supporting multiple modes of learning on-chip. Furthermore, such neuromorphic computing hardware may be connected to, integrated with, or otherwise used together with general computing hardware (e.g., a CPU) to support a wide range of traditional workloads as well as non-traditional workloads such as dynamic pattern learning and adaptation, constraint satisfaction and sparse coding using a single compute platform. Such a solution may leverage understandings from biological neuroscience regarding the improvement of system level performance by leveraging various learning modes such as unsupervised, supervised and reinforcement using spike timing and asynchronous computation, among other example features and considerations.

Figure 2A:
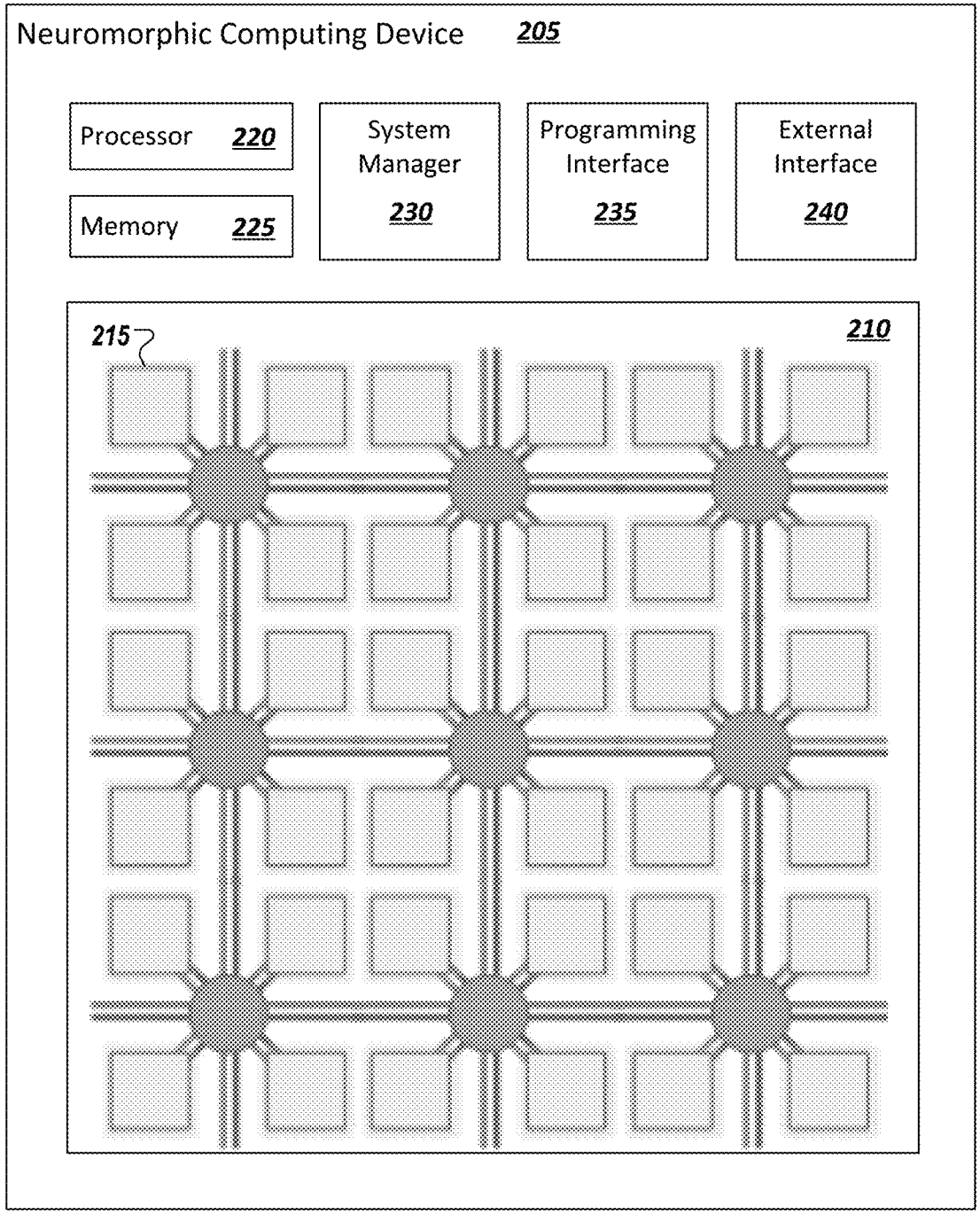
FIG. 2A illustrates a simplified block diagram of an example neuromorphic computing device utilizing a network of hardware-implemented neuromorphic cores.

In one implementation, a neuromorphic computing system is provided that adopts a multicore architecture where each core houses the computing elements including neurons, synapses with on-chip learning capability, and local memory to store synaptic weights and routing tables. FIG. 2A is a simplified block diagram 200 illustrating an example of at least a portion of such a neuromorphic computing device 205. As shown in this example, a device 205 may be provided with a network 210 of multiple neural network cores interconnected by an on-device network such that multiple different connections may be potentially defined between the cores. For instance, a network 210 of spiking neural network cores may be provided in the device 205 and may each communicate via short packetized spike messages sent from core to core over the network channels. Each core (e.g., 215) may possess processing and memory resources and logic to implement some number of primitive nonlinear temporal computing elements, such as multiple (e.g., 1000+) distinct artificial neurons (referred to herein as "neurons"). For instance, each core may be capable of concurrently implementing multiple neurons such that the collection of neuromorphic cores may implement many multiples of neurons using the device.

Continuing with the example of FIG. 2A, a neuromorphic computing device 205 may additionally include a processor 220 and system memory 225 to implement one or more components to manage and provide functionality of the device. For instance, a system manager 230 may be provided to manage global attributes and operations of the device (e.g., attributes affecting the network of cores 210, multiple cores in the network, interconnections of the device 205 with other devices, manage access to global system memory 225, among other potential examples). In one example, a system manager 230 may manage the definition and provisioning of a specific routing tables to the various routers in the network 210, orchestration of a network definition and attributes (e.g., weights, decay rates, etc.) to be applied in the network, core synchronization and time multiplexing management, routing of inputs to the appropriate cores, among other potential functions.

As another example, a neuromorphic computing device 205 may additionally include a programming interface 235 through which a user or system may specify a neural network definition to be applied (e.g., through a routing table and individual neuron properties) and implemented by the mesh 210 of neuromorphic cores. A software-based programming tool may be provided with or separate from the neuromorphic computing device 205 through which a user may provide a definition for a particular neural network to be implemented using the network 210 of neuromorphic cores. The programming interface 235 may take the input of the programmer to then generate corresponding routing tables and populate local memory of individual neuromorphic cores (e.g., 215) with the specified parameters to implement a corresponding, customized network of artificial neurons implemented by the neuromorphic cores.

In some cases, a neuromorphic computing device 205 may advantageously interface with and interoperate with other devices, including general purpose computing devices, to realize certain applications and use cases. Accordingly, external interface logic 240 may be provided in some cases to communicate (e.g., over one or more defined communication protocols) with one or more other devices. An external interface 240 may be utilized to accept input data from another device or external memory controller acting as the source of the input data. An external interface 240 may be additionally or alternatively utilized to allow results or output of computations of a neural network implemented using the neuromorphic computing device 205 to be provided to another device (e.g., another general purpose processor implementing a machine learning algorithm) to realize additional applications and enhancements, among other examples.

Figure 2B:
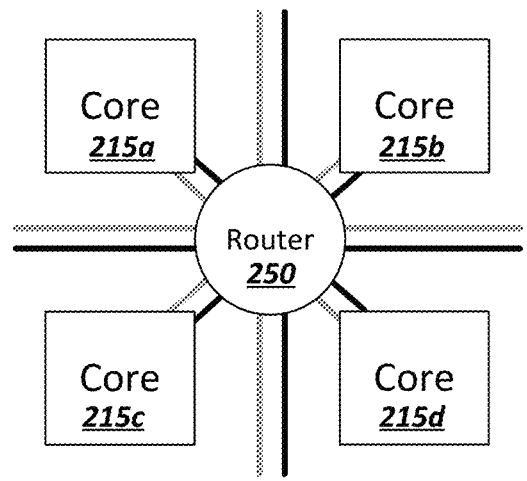
FIG. 2B illustrates a simplified block diagram illustrating a portion of a network of neuromorphic cores interconnected by one or more routers.

As shown in FIG. 2B, a block diagram 200b is shown illustrating a portion of a network fabric interconnecting multiple neuromorphic cores (e.g., 215a-d). For instance, a number of neuromorphic cores (e.g., 215a-d) may be provided in a mesh, with each core being interconnected by a network including a number of routers (e.g., 250). In one implementation, each neuromorphic core (e.g., 215a-d) may be connected to a single one of the routers (e.g., 250) and each of the routers may be connected to at least one other router (as shown at 210 in FIG. 2A). As an example, in one particular implementation, four neuromorphic cores (e.g., 215a-d) may be connected to a single router (e.g., 250) and each of the routers may be connected to two or more other routers to form a manycore mesh, allowing each of the neuromorphic cores to interconnect with each other neuromorphic core in the device. Moreover, as each neuromorphic core may be configured to implement multiple distinct neurons, the router network of the device may similarly enable connections, or artificial synapses (or, simply, "synapses"), to be defined between any two of the potentially many (e.g., 30,000+) neurons defined using the network of neuromorphic cores provided in a neuromorphic computing device.

Figure 2C:
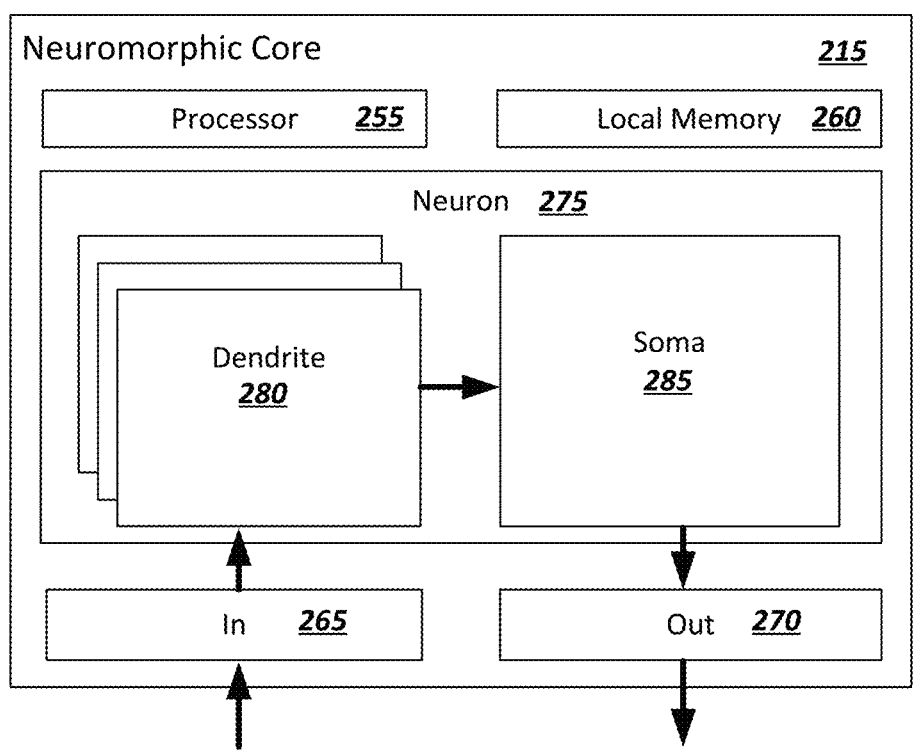
FIG. 2C illustrates a simplified block diagram of an example one of the number of neuromorphic cores implemented in an example neuromorphic computing device.

FIG. 2C shows a block diagram 200c illustrating internal components of one example implementation of a neuromorphic core 215. In one example, a single neuromorphic core may implement some number of neurons (e.g. 1024) that share architectural resources of the neuromorphic core in a time-multiplexed manner. In one example, each neuromorphic core 215 may include a processor block 255 capable of performing arithmetic functions and routing in connection with the realization of a digitally implemented artificial neuron, such as explained herein. Each neuromorphic core 215 may additionally provide local memory in which a routing table may be stored and accessed for a neural network, accumulated potential of each soma of each neuron implemented using the core may be tracked, parameters of each neuron implemented by the core may be recorded, among other data and usage. Components, or architectural resources, of a neuromorphic core 215 may further include an input interface 265 to accept input spike messages generated by other neurons on other neuromorphic cores and an output interface 270 to send spike messages to other neuromorphic cores over the mesh network. In some instances, routing logic for the neuromorphic core 215 may be at least partially implemented using the output interface 270. Further, in some cases, a core (e.g., 215) may implement multiple neurons within an example SNN and some of these neurons may be interconnected. In such instances, spike messages sent between the neurons hosted on the particular core may forego communication over the routing fabric of the neuromorphic computing device and may instead by managed locally at the particular neuromorphic core.

Each neuromorphic core may additionally include logic to implement, for each neuron 275, an artificial dendrite 280 and an artificial soma 185 (referred to herein, simply, as "dendrite" and "soma" respectively). The dendrite 280 may be a hardware-implemented process that receives spikes from the network. The soma 285 may be a hardware-implemented process that receives each dendrite's accumulated neurotransmitter amounts for the current time and evolves each dendrite and soma's potential state to generate outgoing spike messages at the appropriate times. A dendrite 280 may be defined for each connection receiving inputs from another source (e.g., another neuron). In one implementation, the dendrite process 280 may receive and handle spike messages as they serially arrive in time-multiplexed fashion from the network. As spikes are received, the neuron's activation (tracked using the soma 285 (and local memory 260)) may increase. When the neuron's activation exceeds a threshold set for the neuron 275, the neuron may generate a spike message that is propagated to a fixed set of fanout neurons via the output interface 270. The network distributes the spike messages to all destination neurons, and in response to those neurons, in turn, update their activations in a transient, time-dependent manner, and so on, potentially causing the activation of some of these destination neurons to also surpass corresponding thresholds and trigger further spike messages, as in real biological neural networks.

As noted above, a neuromorphic computing device may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as shown in the example of FIGS. 2A-C may advantageously supports all of these network models. As all cores of the device are connected, all neurons defined in the cores are therefore also fully connected through some number of router hops. The device may further include fully configurable routing tables to define a variety of different neural networks by allowing each core's neurons to distribute their spikes to any number of cores in the mesh to realize fully arbitrary connectivity graphs.

In an improved implementation of a system capable of supporting SNNs, such as the very large scale integration (VLSI) hardware device illustrated in the example of FIGS. 2A-C, high speed and reliable circuits may be provided to implement SNNs to model the information processing algorithms as employed by the brain, but in a more programmable manner. For instance, while a biological brain can only implement a specific set of defined behaviors, as conditioned by years of development, a neuromorphic processor device may provide the capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of the neural circuits found in nature.

As an example, a neuromorphic processor may utilize time-multiplexed computation in both the spike communication network and the neuron machinery of the device to implement SNNs. Accordingly, the same physical circuitry of the processor device may be shared among many neurons to realize higher neuron density. With time multiplexing, the network can connect N cores with O(N) total wiring length, whereas discrete point-to-point wiring would scale as $O(N^2)$, realizing a significant reduction in wiring resources to accommodate planar and non-plastic VLSI wiring technologies, among other examples. In the neuromorphic cores, time multiplexing may be implemented through dense memory allocation, for instance, using Static Random Access Memory (SRAM), with shared buses, address decoding logic, and other multiplexed logic elements. State of each neuron may be stored in the processor's memory, with data describing each neuron state including state of each neuron's collective synapses, all currents and voltages over its membrane, among other example information (such as configuration and other information).

In one example implementation, a neuromorphic processor may adopt a "digital" implementation that diverts from other processors adopting more "analog" or "isomorphic" neuromorphic approaches. For instance, a digital implementation may implement the integration of synaptic current using digital adder and multiplier circuits, as opposed to the analog isomorphic neuromorphic approaches that accumulate charge on capacitors in an electrically analogous manner to how neurons accumulate synaptic charge on their lipid membranes. The accumulated synaptic charge may be stored, for instance, for each neuron in local memory of the corresponding core. Further, at the architectural level of an example digital neuromorphic processor, reliable and deterministic operation may be realized by synchronizing time across the network of cores such that any two executions of the design, given the same initial conditions and configuration, will produce identical results. Asynchrony may be preserved at the circuit level to allow individual cores to operate as fast and freely as possible, while maintaining determinism at the system level. Accordingly, the notion of time as a temporal variable may be abstracted away in the neural computations, separating it from the "wall clock" time that the hardware utilized to perform the computation. Accordingly, in some implementation, a time synchronization mechanism may be provided that globally synchronizes the neuromorphic cores at discrete time intervals. The synchronization mechanism allows the system to complete a neural computation as fast as the circuitry allows, with a divergence between run time and the biological time that the neuromorphic system models.

In operation, the neuromorphic mesh device may begin in an idle state with all neuromorphic cores inactive. As each core asynchronously cycles through its neurons, it generates spike messages that the mesh interconnect routes to the appropriate destination cores containing all destination neurons. As the implementation of multiple neurons on a single neuromorphic core may be time-multiplexed, a time step may be defined in which all spikes involving the multiple neurons may be processed and considered using the shared resources of a corresponding core. As each core finishes servicing its neurons for a respective time step, the cores may, in some implementations, communicate (e.g., using a handshake) with neighboring cores using synchronization messages to flush the mesh of all spike messages in flight, allowing the cores to safely determine that all spikes have been serviced for the time step. At that point all cores may be considered synchronized, allowing them to advance their time step and return to the initial state and begin the next time step.

Given this context, and as introduced above, a device (e.g., 205) implementing a mesh 210 of interconnected neuromorphic cores may be provided, with the core implementing potentially multiple artificial neurons capable of being interconnected to implement an SNN. Each neuromorphic core (e.g., 215) may provide two loosely coupled asynchronous processes: an input dendrite process (e.g., 280) that receives spikes from the network and applies them to the appropriate destination dendrite compartments at the appropriate future times, and an output soma process (e.g., 285) that receives each dendrite compartment's accumulated neurotransmitter amounts for the current time and evolves each dendrite and soma's membrane potential state, generating outgoing spike messages at the appropriate times (e.g., when a threshold potential of the soma has been reached). Note that, from a biological perspective, the dendrite and soma names used here only approximate the role of these functions and should not be interpreted too literally.

Spike messages may identify a particular distribution set of dendrites within the core. Each element of the distribution set may represent a synapse of the modeled neuron, defined by a dendrite number, a connection strength (e.g., weight W), a delay offset D, and a synapse type, among potentially other attributes. In some instances, each weight $W_i$ may be added to the destination dendrite's total current u scheduled for servicing at time step $T+D_i$ in the future. While not handling input spikes, the dendrite process may serially service all dendrites sequentially, passing the total current u for time T to the soma stage. The soma process, at each time step, receives an accumulation of the total current u received via synapses mapped to specific dendritic compartments of the soma. In the simplest case, each dendritic compartment maps to a single neuron soma. In other instances, a neuromorphic core mesh architecture may additionally support multi-compartment neuron models. Core memory may store the configured attributes of the soma and the state of the soma, the total accumulated potential at the soma, etc. In some instances, synaptic input responses may be modeled in the core with single-time-step current impulses, low state variable resolution with linear decay, and zero-time axon delays, among other example features. In some instances, neuron models of the core may be more complex and implement higher resolution state variables with exponential decay, multiple resting potentials per ion channel type, additional neuron state variables for richer spiking dynamics, dynamic thresholds implementing homeostasis effects, and multiple output spike timer state for accurate burst modeling and large axonal delays, among other example features. In one example, the soma process implemented by each of the neuromorphic cores may implement a simple current-based Leaky Integrate-and-Fire (LIF) neuron model.

Figure 3A:
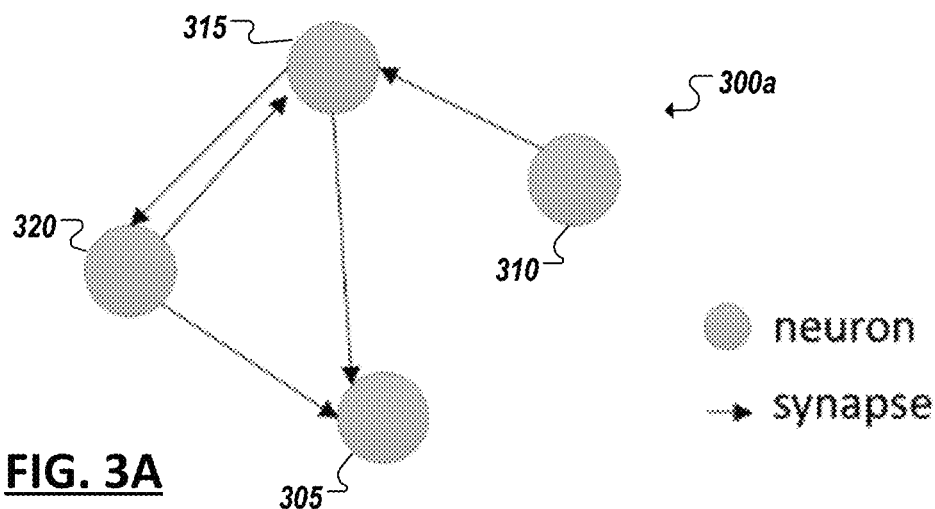
FIGS. 3A-3B are simplified block diagrams of portions of example neural networks capable of being implemented using an example neuromorphic computing device.

A neuromorphic computing device, such as introduced in the examples above, may be provided to define a spiking neural network architecture abstraction that can efficiently solve a class of sparse coding problems. As noted above, the basic computation units in the architecture may be neurons and the neurons may be connected by synapses, which define the topology of the neural network. Synapses are directional, and neurons are able to communicate to each other if a synapse exists. FIG. 3A is a simplified block diagram 300a illustrating a simple example neural network, including neurons 305, 310, 315, 320 connected by synapses. The synapses allow spike messages to be transmitted between the neurons. For instance, neuron 305 may receive spike messages generated by neurons 315, 320. As neuron 305 receives spike messages from the other neurons it is connected to, the potential of the neuron 305 may exceed a threshold defined for the neuron 305 (e.g., defined in its soma process) to cause the neuron 305 itself to generate and transmit a spike message. As noted, synapses may be directional. In some cases, a network and corresponding synapses may be defined such that a neuron (e.g., 315) only receives or transmits to some of the other neuron (e.g., 305), while in synapses may be defined which connect the neuron bi-directionally with other neurons (e.g., between neurons 315, 320) to create a feedback loop, among other examples.

An example neuromorphic computing device may adopt leaky integrate-and-fire neurons and current-based synapses. Accordingly, the dynamics of the network may be driven by the evolution of the state variables in each neuron. In one example, each neuron has two types of state variables: one membrane potential v(t), and one or more dendritic current (s) $u^1(t), \ldots$ to $u^s(t)$. An individual neuron's dynamics may be defined by the following continuous-time differential equations (1)-(3).

$$\frac{du^k(t)}{dt} = \frac{-1}{\tau_s^k} u^k(t), k = 1, 2, \ldots, s \tag{1}$$

$$\frac{dv(t)}{dt} = \frac{-1}{\tau_m} v(t) + \sum_{k=1}^{s} u^k(t) + I^{bias} \tag{2}$$

$$\text{if } v(t^-) \geq \theta, \text{ Spike, and } v(t^+) = 0 \tag{3}$$

Equation (1) depicts the dynamics of dendritic current. Each dendritic current variable may be defined to decay exponentially over time, according to its respective decay time constant $\tau_s^k$. The dendritic current may be linearly summed to control the integration of the membrane potential (as shown in Equation (2)). Similar to dendritic current, the membrane potential may also be subject to exponential decay with a separate membrane potential time constant $\tau_m$. Equation (3) may define the spiking event of a neuron. When a neuron's membrane potential reaches a particular threshold voltage θ defined for the neuron, the neuron (e.g., through its soma process) resets the membrane potential to zero, and sends out a spike to neighboring neurons connected by corresponding synapses. The dendrite process of each neuron can be defined such that a spike arrival causes a change in the dendritic current. Such interactions between neurons lead to the complex dynamics of the network. Spikes are transmitted along synapses and the incoming synapse may be defined to be associated with one dendritic current variable, e.g., using the dendritic compartment. In such implementations, each spike arrival changes only one dendritic current $u^k(t)$. The change may be defined to manifest as an instantaneous jump in $u^k(t)$, such as defined in Equation (4), based on the magnitude of the synaptic weight $w_{ij}$.

$$u^k(t^+) = u^k(t^-) + w_{ij} \tag{4}$$

Accordingly, in some implementations, in addition to the state variables of a neuron, there are several other configurable parameters, including the time constant of individual dendritic compartment $\tau_s^1, \ldots, \tau_s^s$, a single $\tau_m, \theta, I^{bias}$ for each neuron, and a configurable weight value $w_{ij}$ for each synapse from neuron j to i, which may be defined and configured to model particular networks.

Figure 3B:
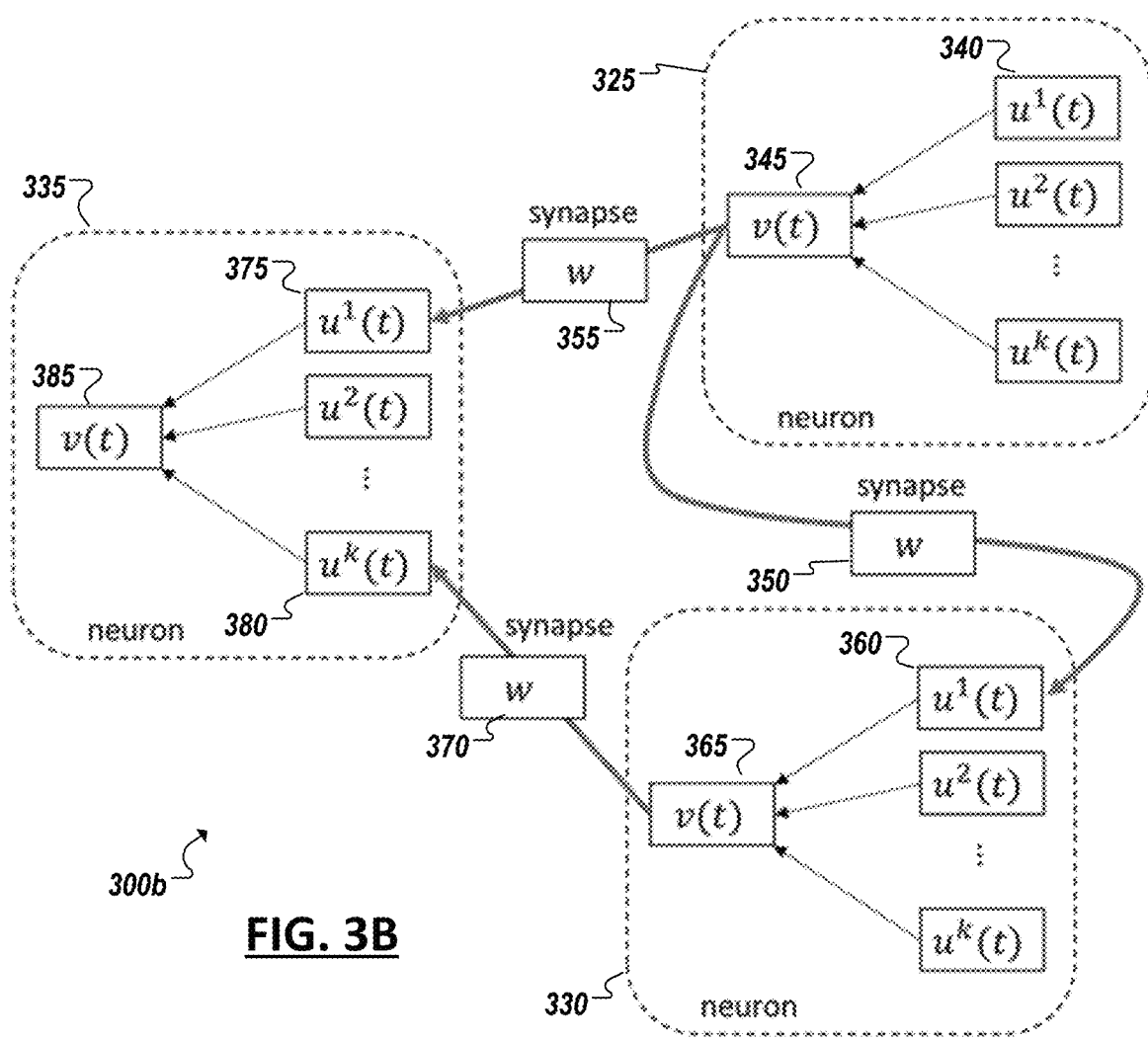

For instance, FIG. 3B shows an example illustrating synaptic connections between individual dendrites of neurons in a network, and the parameters that may be defined for these neurons and synapses. As an example, in FIG. 3B, neurons 325, 330, 335 implemented by cores of an example neuromorphic computing device are shown, together with synapses defined (e.g., using a routing table) for interconnections within a neural network implemented using the neurons 325, 330, 335. Each neuron may include one or more dendrite (processes) (e.g., 340, 360, 375, 380) and a respective soma (process) (e.g., 345, 365, 385). Spike messages received at each of the dendrites of a respective neuron may contribute to the activation potential of the soma, with the soma firing a spike message when the soma-specific potential threshold is reached. A synapse connects two neurons. The synapse may effectively connect the soma of a sending neuron to one of the dendrites of the receiving neuron. Further, each synapse may be assigned a respective weight (e.g., 350, 355, 370). In the example of FIG. 3B, a synapse with a first weight 350 may connect soma 345 of neuron 325 with dendrite 360 of neuron 330. Soma 345 of neuron 325 may additionally connect to neuron 380 via another synapse (with potentially a different weight 355). Soma 365 of neuron 330 may also connect to neuron 380 via a respective synapse 370. In some cases, multiple neurons may connect to a particular neuron at the same dendrite of the particular neuron. In such instances, the parameters defined for this one dendrite will govern the effect of the incoming spike messages from each of the connected neurons. In other cases, such as shown in FIG. 3B, different neurons (e.g., 325, 330) may connect to the same neuron (e.g., 335) but at different dendrites (e.g., 375 and 380 respectively), allowing different parameters (defined for each of these dendrites (e.g., 375, 380)) to affect the respective spikes arriving from each of these different neurons (e.g., 325, 330). Likewise, parameters may be defined for each of the somas (e.g., 345, 365, 385) of each of the various neurons (e.g., 325, 330, 335) defined in the network, allowing these parameters to likewise contribute to the overall configurability of the neural network implemented using the neuromorphic computing device, among other examples.

As a summary, neuron parameters may include such examples as a synaptic decay time constant $\tau_s$, bias current $I_b$, firing potential threshold $\theta$, and synaptic weight $w_{ij}$ from neuron to neuron (i.e., from neuron j to neuron i). These parameters may be set by a programmer of the neural network, for instance, to configure the network to model a real network, matrix, or other entity. Further, neuron state variables may be defined to include time-varying current u(t) and voltage v(t) and represented by corresponding ordinary differential equations.

As noted above, Equations (1)-(4) defines spiking neural network dynamics in continuous time. In a digital neuromorphic computing device, a network of neuromorphic cores is provided (such as shown and discussed in connection with FIGS. 2A-2C), with each of the neuromorphic cores possessing processor resources and logic executable to solve the continuous network dynamics using first-order techniques, such as by approximating SNN dynamics using discrete time steps. In one example, a virtual global clock is provided in the neuromorphic computing device to coordinate the time-stepped updates of individual neurons at each core. Within a time step, every neuron implemented by the network of cores can adjust (e.g., in a time-multiplexed manner) its respective state variables, and will do so no more than once per time step. Further, each spike message generated by a neuron in the SNN may be guaranteed to be delivered within a corresponding time step. Such a digital approximation may be realized as follows. Given the values of state variables at time $t_1$, the state variable values at $t_2$ after a fixed time interval $\Delta t$, $t_2 = t_1 + \Delta t$, can be obtained using Equations (5)-(8):

$$u^k(t_2^-) = u^k(t_1)e^{\frac{-\Delta t}{\tau_s^k}}, k = 1, 2, \ldots, s \quad (5)$$

$$v(t_2^-) = v(t_1)e^{\frac{-\Delta t}{\tau_m}} + \sum_{k=1}^{s} \tau_s^k[u^k(t_1) - u^k(t_2^-)] + I^{bias}\Delta t \quad (6)$$

$$\begin{cases} \text{if } v(t_2^-) \geq \theta, & \text{Spike, and } v(t_2) = 0 \\ \text{otherwise}, & v(t_2) = v(t_2^-) \end{cases} \quad (7)$$

$$u^k(t_2) = u^k(t_2^-) + \sum_j w_{ij}, \text{ for all spike arrivals to neuron } i \quad (8)$$

Figure 4A:
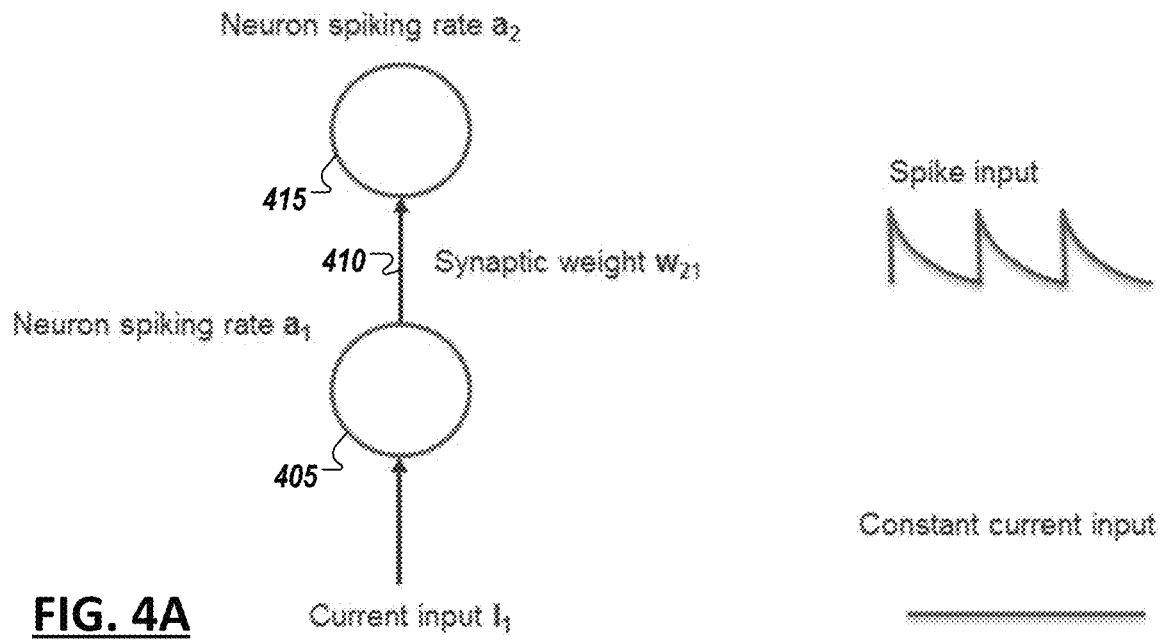
FIG. 4A is a simplified block diagram illustrating a portion of an example spiking neural network (SNN).
Figure 4B:
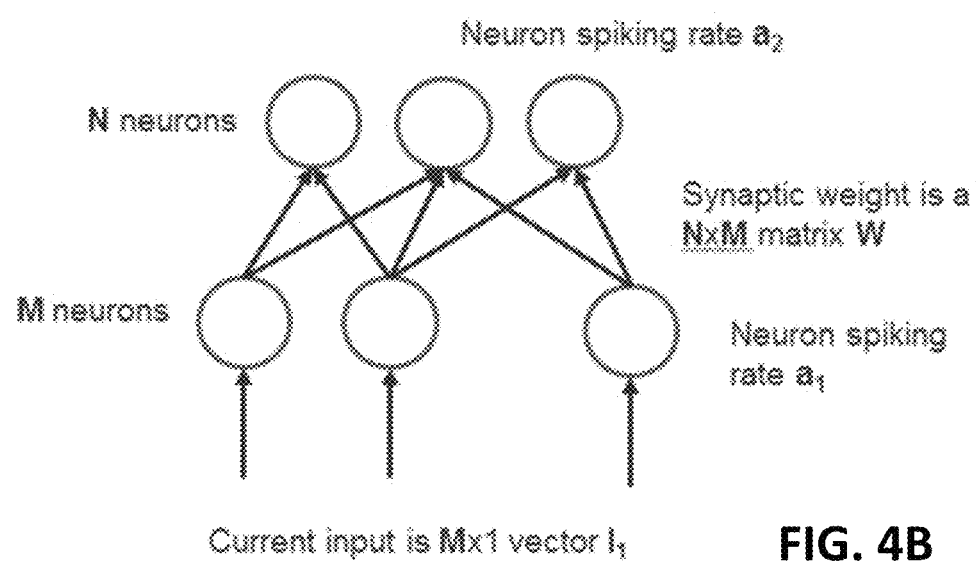
FIGS. 4B-4C are simplified block diagrams illustrating example simplified SNNs.
Figure 4C:
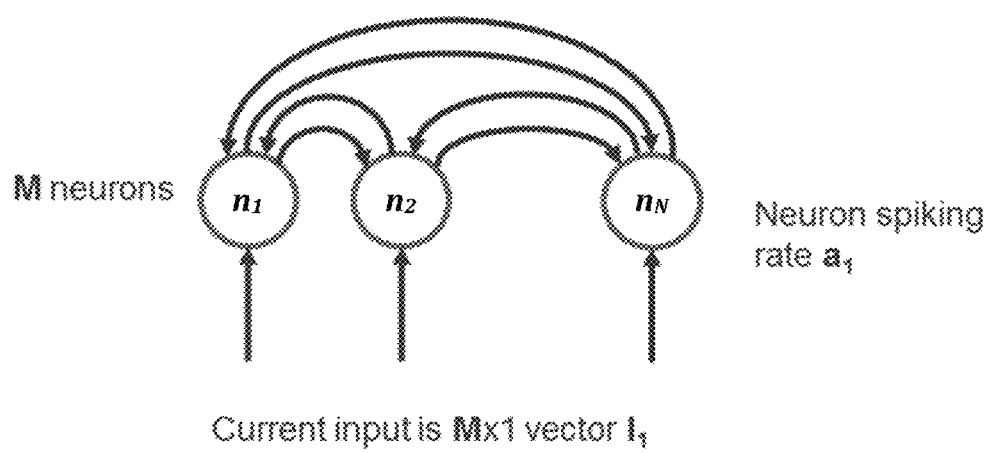

Turning to FIGS. 4A-4C, representations 400*a*-*c* are provided of interconnected artificial neurons within example spiking neural networks. As shown in FIG. 4A, an input current $I_1$ is provided to a first neuron 405, resulting in an increase in the potential of the neuron 405 until a threshold potential is reached and a spike message is generated by neuron 405. When a constant current input is applied at the first neuron, a predictable spike output at a fixed spiking rate $a_1$ (expressing the rate of spike messages generated over time) This spike message output (e.g., 410) may be then provided via one or more outbound synapses connecting the first neuron 405 to one or more other neurons (e.g., 415). A synaptic weight $w_{21}$ may be defined for the artificial synapse connecting the two neurons 405, 415. The second neuron 415 may receive the spike inputs 410 generated by the first neuron 405 causing spike messages to likewise be generated by the second neuron 405 when the internal membrane potential threshold of the second neuron is met, resulting a neuron spiking rate $a_2$ of the second neuron 415. The neuron dynamics of this simplified network shown in FIG. 4A may be expressed by linear arithmetic $$a_1 = I_1$$

$$a_2 = w_{21}a_1$$

Other attributes and parameters of individual neurons and synapses may be defined and influence the rate at which spikes are generated and the dynamics of the network. For instance, Parameter may be defined (e.g., via user or other programmatic inputs) to define parameters for each neuron in a network including a synaptic decay time constant ($\tau_s$), bias current ($I_b$), synaptic weight from neuron j to neuron i ($w_{ij}$), membrane firing threshold ($\theta$), among other examples. State of each neuron may be calculated and maintained (by corresponding neuromorphic cores implementing the neurons). Neuron state variables may be time varying and determined by the following ordinary differential equations u(t): current; v(t): voltage, where $\delta(t)$ represents the spiking messages, or input, received at the neuron:

$$\tau_s \frac{du}{dt} = -u + \sum w_{ij}\delta(t)$$

$$\frac{dv}{dt} = u + I_b$$

if $v(t) > \theta$, send spike and $v(t) \leftarrow 0$

The relationship between synaptic weight, input, and spiking rate may be leveraged to define SNNs to model numerical matrices and perform matrix arithmetic using the SNN. For instance, as shown in FIG. 4B, a collection of M neurons may be connected to another collection of N neurons, such that a unidirectional synaptic connection is defined from each one of the M neurons to each one of the N neurons, as illustrated in FIG. 4B. An input $I_1$ may be defined to be provided to the first layer of M neurons, such that the input defines an M×1 vector $I_1$. Respective synaptic weights $w_{nm}$ may be defined for each of the synapses connecting neurons in the first row to neurons in the second row, as in the example of FIG. 4B. The M×N number of synapses and corresponding weights may be represented as an N×M matrix W of the synaptic weights. Expanding on the foundation illustrated in FIG. 4B, the respective spiking rates $a_2$ of the top layer of neurons may be based on the spiking rates $a_1$ of the neurons in the first layer. An N×1 vector $a_2$ may express the collected spiking rates of the second (top) layer of neurons in the network, while an M×1 vector M×1 vector $a_1$ may express the collected spiking rates of the first (bottom) layer of neurons. Given the relationship between $a_1$ and $a_2$ the neuron dynamics of an SNN that interconnects a top and bottom layer of neurons may be used to represent the matrix-vector multiplication:

$a_1 = I_1$ $a_2 = Wa_1$

Thus, $a_2 = WI_1$

Accordingly, the observed spiking rate of the top layer may represent the product of the inverse of the matrix W multiplied with vector $I_1$. By assigning synaptic weights to the SNN such that W corresponds to a numerical matrix with corresponding values and applying inputs to the SNN such that the inputs $I_1$ correspond to values of a numerical vector, the SNN can "perform" the matrix-vector multiplication of the numerical matrix and numerical vector based on proper programming of a SNN network (similar to the example shown in FIG. 4B). For instance, a programmable neuromorphic computing device may be programmed to define the M+N neurons and synapses connecting them with weights corresponding to the matrix to be multiplied by the SNN solver.

Turning to FIG. 4C, recurrent connections (and synapses) may be defined for an M×1 vector of artificial neurons in an SNN. A recurrently connected layer of neurons may be defined with respective synaptic weights represented by an M×M matrix W. An input provided to the M neurons may be represented as a vector $1_1$, which may produce spikes (fed recurrently to the neurons in the network) firing at respective spiking rates (represented by an M×1 vector $a_1$). Further, it should be appreciated that at steady state the input will be cancelled out by the product of W and $a_1$ such that: $I_1 - Wa_1 = 0$, or $a_1 = W^{-1} I_1$ In other words, detecting a steady state manifesting in the spiking rates observed in a recurrently connected SNN may solve, or at least approximate, a matrix inverse problem involving the matrix W. Accordingly, as in the example of FIG. 4B, a configurable neuromorphic computing device may be programmed to implement a recurrently connected network of artificial neurons with synaptic weights corresponding to values of a matrix W and may be provided with a vector input with values corresponding to a vector $I_1$ to solve for the product of the inverse of the matrix W and the vector $I_1$, as illustrated in FIG. 4C.

Figure 5A:
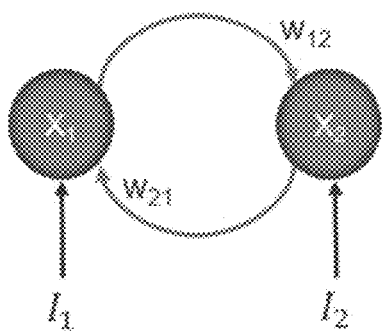
FIGS. 5A-5D are block diagrams illustrating principles corresponding to steady state conditions of various portions of examples SNNs.
Figure 5B:
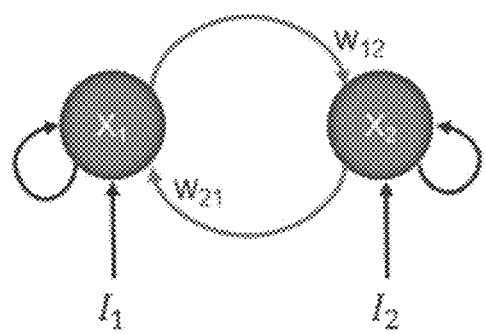
Figure 5C:
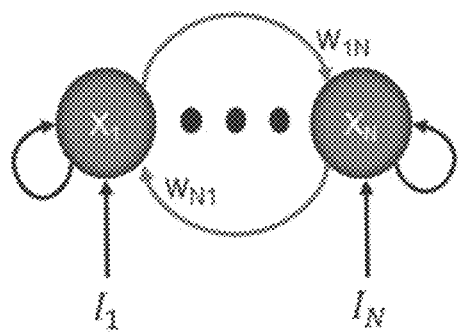
Figure 5D:
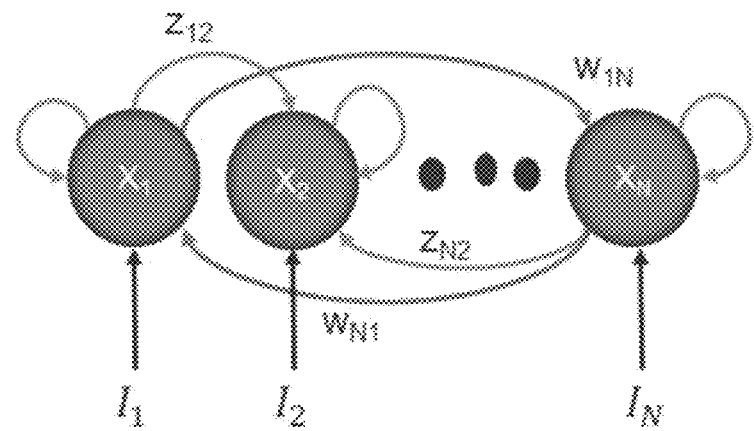

Turning to FIGS. 5A-5D, block diagrams 500a-d are shown illustrating the types of synaptic connections that may utilize by neural network designers to construct SNNs to model various matrix calculations including matrix inversions, matrix multiplication, and others. For instance, FIG. 5A illustrates a simple two-neuron case. The firing thresholds of the neurons may be configured as $\alpha_1$ and $\alpha_2$, and the inputs configured as $I_1$ and $I_2$. The two directional synapses connecting the two neurons have weights $w_{12}$ and $w_{21}$, with synaptic decay time constant $\epsilon_1$ and $\epsilon_2$. At steady state, the firing rates of the neurons $x_1$ and $x_2$ correspond to a solution of an inverse problem. FIG. 5B shows an extension of the example of FIG. 5A by adding synapses connecting a neuron to itself (i.e., recurrently), for which the steady state firing rate is still a solution of another inverse problem. FIG. 5B thereby shows an alternative to FIG. 5A for constructing a spiking neural network to solve an inverse problem. FIG. 5C shows that the example of FIG. 5B can be generalized to an arbitrary dimension of N neurons, solving an N×N inverse problem, with FIG. 5D showing further generalizations by adding inhibitory synapses between a pair of neurons, allowing more possible configurations to solve an inverse problem. The example of FIG. 5D provides an SNN configured (e.g., using a configurable digital neuromorphic computing architecture) to solve a matrix inversion problem. Such an SNN may be used to solve classes of matrix inversion problems (e.g., manifesting in various scientific computing applications) in an approximate fashion but with high throughput (using small E's) and high energy efficiency (due to spike-based (i.e., sporadic) inter-node communication), among other example advantages.

Figure 6A:
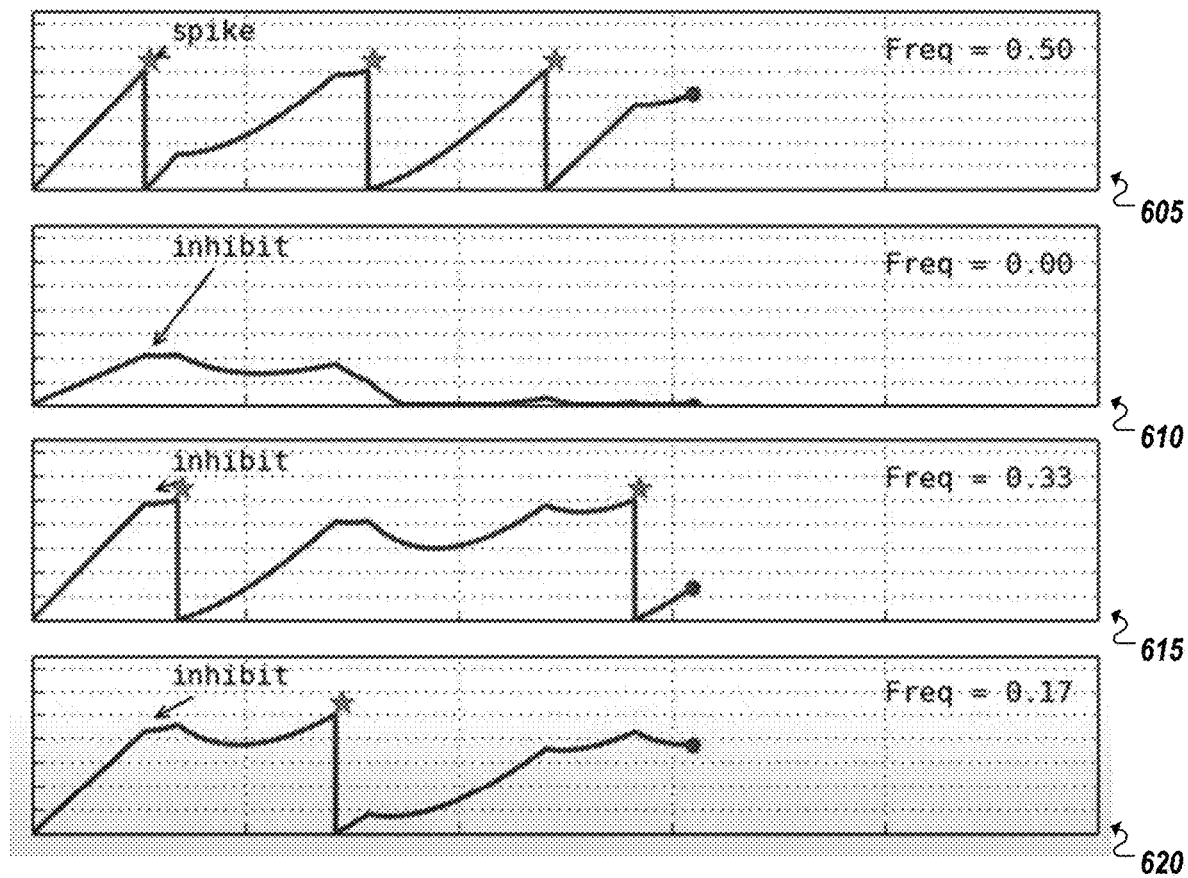
FIGS. 6A-6B are graphs illustrating spiking behavior and spike rates of example neurons with an example SNN.
Figure 6B:
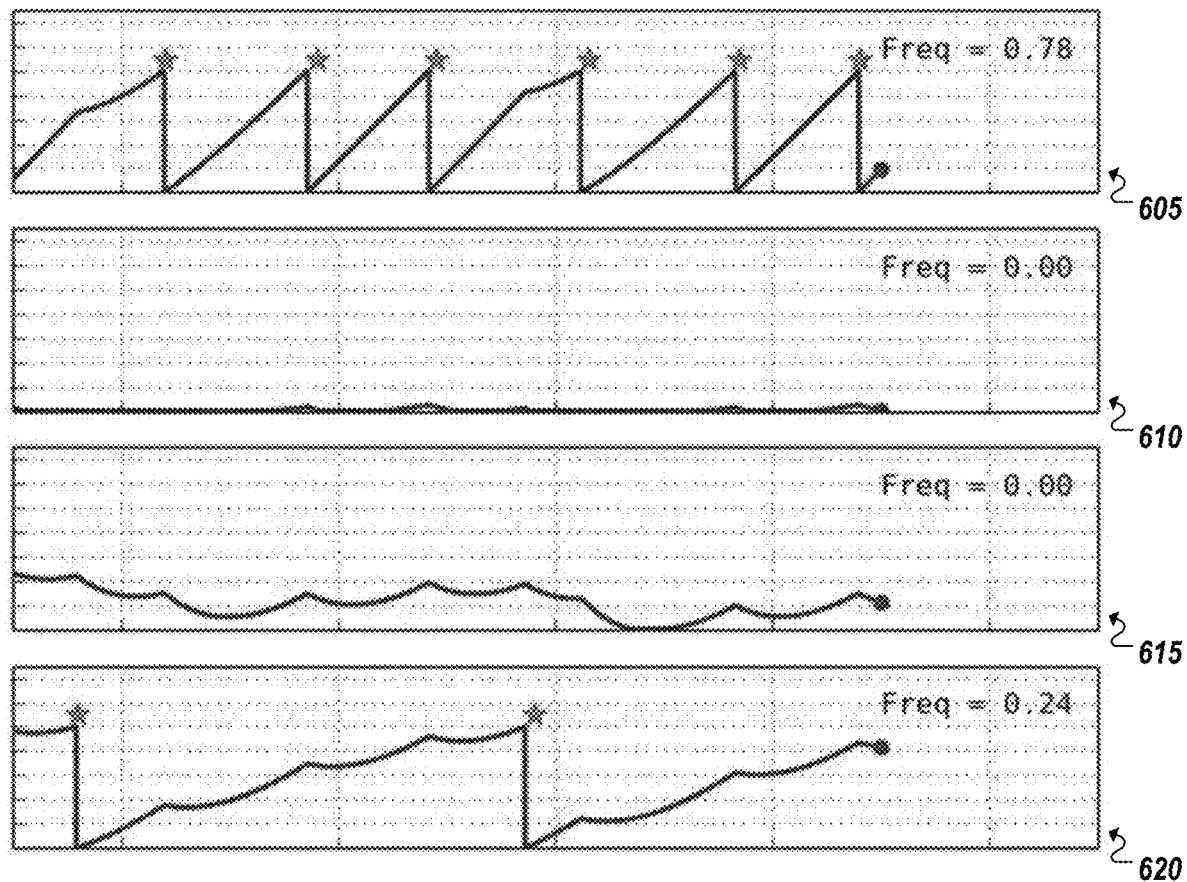

FIGS. 6A-6B illustrate signal diagrams illustrating spiking behavior observed at four nodes (e.g., 605, 610, 615, 620) in an SNN implemented using a neuromorphic computing device employing a network of neuromorphic core elements. The neuromorphic computing device may be programmed to implement a particular SNN that includes a particular number of artificial neurons implemented using the neuromorphic cores. The particular SNN may be further implemented by defining the synaptic connections between the artificial neurons. Parameters of the neurons may be set, including decay rates of the synapses and somas, and weights may be assigned to each synapse, among other configurable parameters to implement the particular SNN. A respective input current or signal may be provided at at least a subset of the neurons in the particular SNN. As illustrated in FIGS. 6A-6B, various spike messages may be generated by the various neurons in the SNN based on their respective parameters, the particular network of synapses connecting the neurons, weights applied to the synapses, etc. Accordingly, the spiking behavior of the neurons may vary across the network. For instance, neuron 605 may spike immediately and continue spiking at semi-regular intervals. Neuron 610, on the other hand may struggle to compile sufficient membrane potential to ever trigger and sent a spiking message on the SNN. FIGS. 6A and 6B further show a spiking frequency, or spiking rate measured by observing spike messages generated by the individual neurons 605, 610, 615, 620. For instance, an interval from time t=0 to t=$t_1$ illustrated in FIG. 6A, a spiking rate of 0.50 may be measured for neuron 605, while rates of 0.00, 0.33, and 0.17 are measured for neurons 610, 615, 620, respectively. FIG. 6B may show spiking behavior of the neurons as measured (as the SNN continues to run) during an interval t=$t_2$ to t=$t_3$, where $t_2 > t_1$. As the SNN has been allowed to continue to run, the spiking rate of each neuron has begun to converge toward a particular value. For instance, in the example of FIG. 6B, the spiking rate of neuron 605 is measured at 0.78, the spiking rate of neuron 620 is measured at 0.24, and the spiking rates of both neurons 610 and 615 are converging to zero. The values shown in the example of FIG. 6B may approximate the "final" equilibrium spiking rates of these four neurons, were the SNN permitted to run infinitely. It should be appreciated that the equilibrium spiking rate values shown in FIGS. 6A-6B are provided as an example only and represent values unique to the particularly configured SNN and neurons in this example. The spiking rates of other SNNs and neurons may be expected to be quite different from those shown in this particular example.

As shown in the examples of FIGS. 6A-6B, it may be assumed that an SNN will reach an equilibrium or steady state after being allowed to run for a time and that spiking rates observed in the SNN may similarly approximate respective steady state values after some period of time (e.g., after some number of time steps). Such equilibrium values may be leveraged in connection with the solving of various matrix inversion problems using an SNN. Particularly, spiking rates may be measured at at least a subset of neurons in an SNN and these values, when at steady state (or at an instance considered to approximate the steady state of the SNN), may represent a result vector to be solved for in the matrix inversion problem. [

Figure 7A:
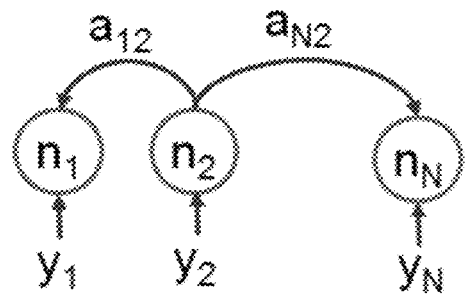
FIGS. 7A-7C are simplified block diagrams illustrating example simplified SNNs configured to approximate solutions for example matrix inverse problems.

As an example, FIG. 7A illustrates an example SNN that may be defined and implemented in a neuromorphic computing device to solve for a vector b that satisfies the equation $r=A^{-1}y$. Utilizing the principles discussed above, a recurrently connected SNN may be programmed and implemented such that the values of matrix A (e.g., $a_{12}$, $a_{N2}$, etc.) are mapped to corresponding synapses defined for the SNN. In one example, a recurrently connected SNN may provide a layer of neurons where each neuron layer connects to the other bi-directionally (i.e., by two synapses each, one synapse in each direction). To solve the problem, the values of the vector y may be adopted as the inputs (e.g., $y_1$, $y_2$, $y_N$, etc.) to be provided to the N neurons (e.g., $n_1$, $n_2$, $n_N$, etc.) provided in the programmed SNN. The SNN may then be allowed to run with the input vector y applied to the SNN and the respective spiking rates (e.g., $r_1$, $r_2$, $r_N$, etc.) of the neurons (e.g., $n_1$, $n_2$, $n_N$, etc.) may be observed (e.g., using a monitoring program through an interface of the neuromorphic computing device, by a management utility local to and executed on the neuromorphic computing device itself, among other examples). The spiking rate values may correspond to the vector r to be solved for in the equation $r=A^{-1}y$. For the spiking rate values to be reliable (and be adopted as an approximate solution of the equation), the SNN may be permitted to run for a time until it is determined that the SNN has reached (or is approaching) a steady state. The steady state may be determined, for instance, by observing that the SNN has for a satisfactory length of time, observing that changes in the values of r are statistically insignificant, among other example criteria. Upon determining that the SNN has reached steady state, the values of the steady state spiking rate may be recorded and provided as a solution to the inverse matrix equation.

In some implementations, the neuromorphic computing device may be provided with logic to determine a steady state condition. For instance, the neuromorphic computing device may select a number of time steps to run the SNN, with the number of time steps selected to correspond to a time in which convergence of the SNN is likely. The neuromorphic computing device may further include logic to calculate, record, and output the steady state spiking rates to an outside system (e.g., that is to consume the results of the SNN's convergence). In other implementations, a system external to and interfacing with the neuromorphic computing device may manage configuration of the SNN and may monitor traffic within the neuromorphic computing device (e.g., by monitoring traffic within the router fabric of the neuromorphic computing device) to detect a steady state condition and calculate steady state firing rates of selected neurons within the SNN, among other example implementations. In other instances, a management system may play a more minimal role in managing the SNN operation, with steady state detection and/or spiking rate calculations facilitated on the neuromorphic computing device and the external management system (e.g., run by an external CPU) periodically evaluating the quality of observed spiking rates, confirming a solution returned by the SNN, among other example features and implementations.

Figure 7B:
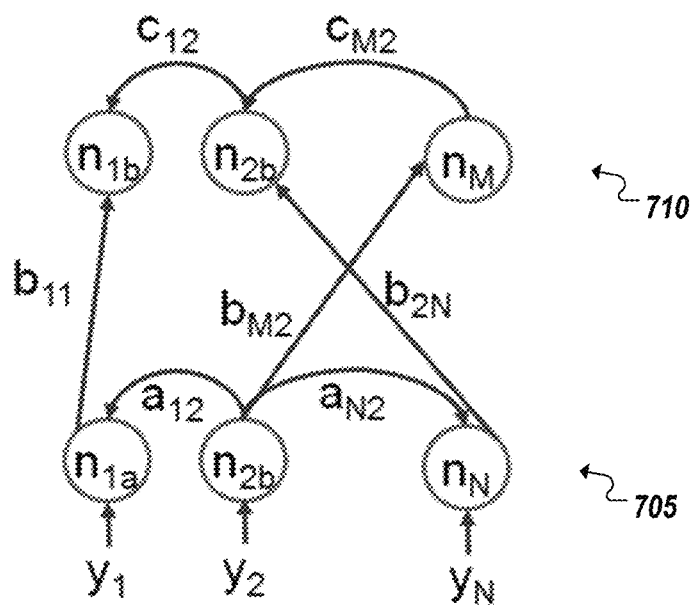

Other, more complex matrix equations may be solved using a configurable neuromorphic computing device, with corresponding SNNs being defined in connection with the solving of these individual equations. For instance, as shown in the example of FIG. 7B, a different SNN may be defined in connection with the solving of a different matrix inverse problem. For instance, the SNN of the example of FIG. 7B may be programmed in connection with the solving of an equation given a matrix $A \in \mathbb{R}^{N \times N}$, $B \in \mathbb{R}^{N \times M}$, $C \in \mathbb{R}^{M \times M}$ and a vector $y \in \mathbb{R}^{-N \times 1}$, where a vector r is to be found that satisfies $r = C^{-1}BA^{-1}y$. In this example, two layers of neurons are defined in the SNN with synapses (with weights $a_{12}$, $a_{N2}$, etc.) defined to recurrently connect the N neurons in the first layer 705 and further synapses (with weights $b_{11}$, $b_{M2}$, $b_{2N}$, etc.) are defined to connect from each of the N neurons in layer to each of the M neurons in the top layer 710 (it should be appreciated that the illustration in FIG. 7B omits representations of some of these synapses in the interest of simplifying the presentation of the example (and similar simplifications are included in the representations of FIGS. 7A and 7C)). Finally, synapses (with weights $c_{12}$, $c_{M2}$, etc.) to recurrently connect the M neurons in top layer may be defined to provide an inverse of a matrix A (modeled using recurrently connected neurons in the first layer), multiplication by a matrix B (modeled using the connection from the first layer of neurons to the second layer of neurons), and the inverse of a matrix C (modeled using recurrently connected neurons in the top layer). Indeed, the SNN may be programmed such that a number N of neurons are provided in the first layer to correspond with a dimension of the matrix A in the equation, and the synaptic weights $a_{12}$, $a_{N2}$, etc. of the recurrent connections in the first layer are programmed to correspond to values of the matrix A. Further, a second layer of neurons may be programmed in the SNN such that a number of M neurons on implemented to correspond to a dimension of the matrix C in the equation, with the synaptic weights (e.g., $c_{12}$, $c_{M2}$, etc.) of the recurrent connections programmed to correspond to values of matrix C. Last, synapses may be programmed to connect the first layer neurons to the second layer neurons (e.g., by defining the synapses in a routing table of the neuromorphic computing device) and weights (e.g., $b_{11}$, $b_{M2}$, $b_{2N}$, etc.) assigned to correspond with values of the matrix B in the equation. Further, input values may be applied at the first layer neurons to correspond with values of the vector y in the equation and the resulting SNN may be left to run using these inputs until a steady state has been determined to have been reached. In this example, the spiking rates of the second layer, or level, of neurons (e.g., $n_{1b}$, $n_{2b}$, $n_N$, etc.) may be observed and recorded upon reaching the steady state, and these values may be adopted to represent the vector variable r. In other words, the spiking rates observed at this second layer of neurons at equilibrium of the SNN illustrated in FIG. 7B may be taken to be an approximate solution for $r=C^{-1}BA^{-1}y$.

Figure 7C:
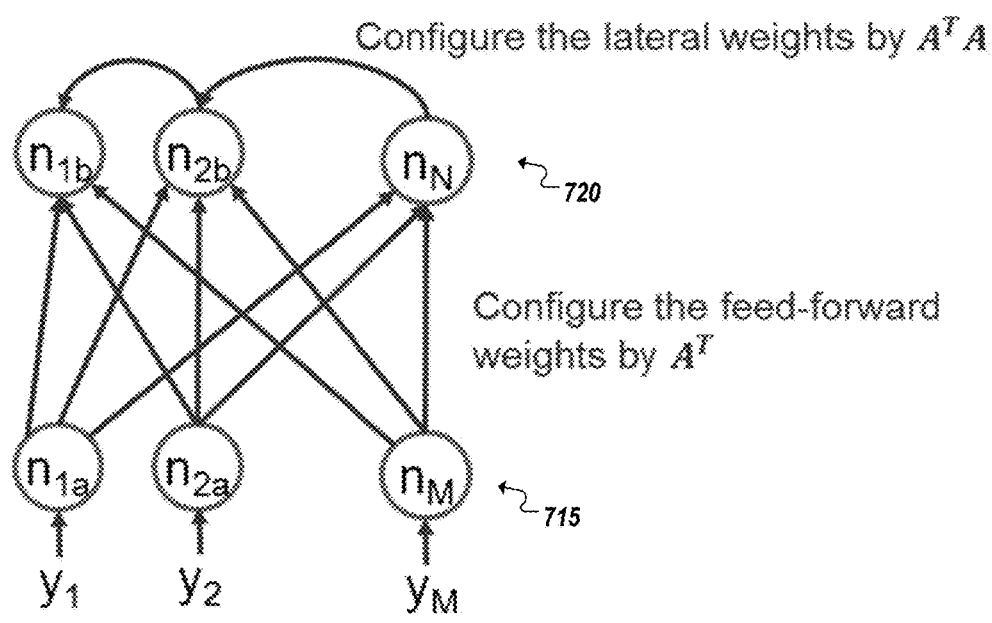

FIG. 7C represents yet another example showing the use of an SNN to determine an approximate solution to a matrix inverse problem. For instance, an equation given a matrix $A \in \mathbb{R}^{M \times N}$ and a vector $y \in \mathbb{R}^{M \times 1}$, a regression problem may be solved to find a vector r that minimizes $\|y-Ar\|_2^2$.

Through linear algebra, the solution to such a regression problem may be restated as $r=(A^TA)^{-1}A^Ty$. Based on the principles adopted above, another SNN may be defined that, when run, manifests an approximate solution to the equation. For instance, two layers 715, 720 of neurons may be programmed to be implemented using a neuromorphic computing device with M neurons in a first layer of neurons (e.g., $n_{1a}$, $n_{2a}$, $n_M$, etc.) and N neurons in the second layer (e.g., $N_{1b}$, $n_{2b}$, $n_N$, etc.). The SNN may be programmed with synapses to implement feed-forward connection from the first layer 715 to the second layer 720 of neurons (e.g., by connecting each of the first layer neurons to the second layer neurons) and recurrently connecting the second layer of neurons. Synaptic weights may be selected for the feed forward synapses to correspond to values of the transverse matrix $A^T$ in the equation. Synaptic weights for the recurrent synapses in the second layer 720 of neurons may be selected according to the values of $A^TA$. With the SNN programmed, an input may be provided to the first layer of neurons that is selected to correspond to the values of the M dimensional vector y in the equation. The SNN may be run using this input and the spiking rate of the second layer 720 neurons may be observed, such that the spiking rates at an equilibrium condition of the SNN are adopted as the vector r to approximate the regression solution that minimizes $\|y-Ar\|_2^2$, among other examples.

Depending upon how long the SNN is allowed to run, varying levels of precision may be realized in the solving of various matrix inverse problems using the SNN. For instance, spiking rate values recorded at a first steady state condition determined after a during $t_1$ may be less precise than spiking rate values recorded for the same SNN at a second steady state condition determined after some time has elapsed following $t_1$. Indeed, solutions derived from steady state spiking rate values observed in an SNN may be considered approximations of a corresponding matrix inverse problem. Conventional numerical solver algorithms may realize more precise and reliably solutions to similar matrix inverse problems. However, conventional numerical solvers (e.g., implemented using high performance general purpose computing processors and systems) may adopt iterative algorithms that take a relatively long time to solve complex matrix problems, which may be expensive, both in terms of energy, time, and computing resources. In some cases, a computing system implementing a non-SNN numerical solver may begin the solver algorithm by selecting a guess as a starting point from which to iterate to a solution. The quality of the guess may influence the speed and efficiency at which the solver is inevitably able to arrive at a solution.

Figure 8:
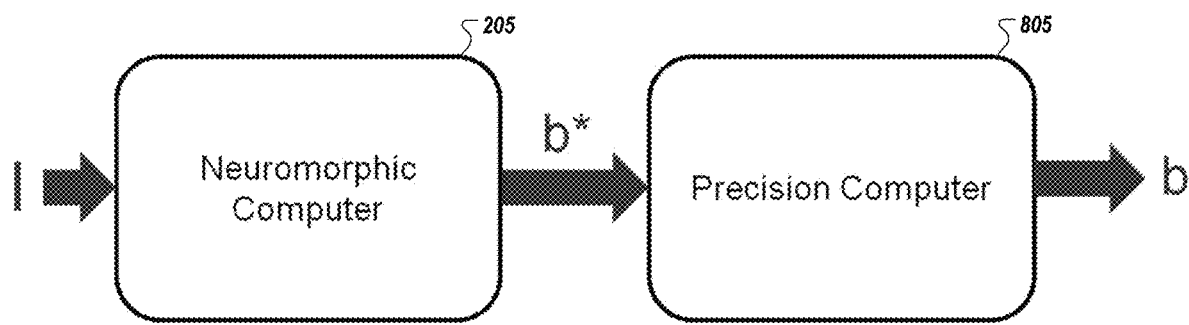
FIG. 8 is a simplified block diagram illustrating use of an approximate solution generated from an example SNN implemented by an example neuromorphic computing device.

FIG. 8 shows a simplified block diagram 800 illustrating a dedicated neuromorphic computing device 205 interfacing with a general purpose computing device 805. The general purpose computing device 805 may adopt a conventional computer processor architecture and may be used to implement and execute a numerical solver algorithm. In one example, prior to running the numerical solver algorithm for a particular matrix inverse problem, a SNN may be programmed and implemented using the neuromorphic computing device 205 that corresponds to matrices involved in the problem to be solved, and the SNN may be run (e.g., by applying an input I corresponding to a vector of the matrix inverse problem) until a steady state is achieved. Equilibrium spiking rates of at least a subset of the neurons implemented in the SNN may be observed and an approximate solution to the matrix inverse problem may be derived based on the equilibrium spiking rates (such as in the examples of FIGS. 7A-7C discussed above). This approximate solution b* may be provided to the general purpose computing device 805 to be used as a first guess or starting point in the high precision numerical solver algorithm (e.g., conjugate gradient, steepest gradient descent, coordinate descent, stochastic gradient descent, etc. For instance, the approximate solution b* derived using the neuromorphic computer 205 may use the approximate solution b* as an initial guess to seed the same matrix inversion problem modeled by the SNN in the high precision solver algorithm executed by the precision computer 805 to derive a high precision solution b. By providing a reliable approximate solution, the speed and efficiency of the high precision numerical solver algorithm may be enhanced, allowing a solution to be more quickly determined using the neuromorphic computer 205 and precision computer 805 in tandem, among other examples.

In some implementations, an SNN implemented using a digital neuromorphic computing device, may solve additional regression problems including classes of sparse coding problems that may be utilized in connection with statistics, machine learning, signal processing, and compressive sensing applications, among other examples. As an example, Equation (9) below represent an "Elastic Net" problem, a general form of sparse coding.

$$\min_a L(a) = \frac{1}{2}\|x - Da\|_2^2 + \lambda_1\|a\|_1 + \lambda_2\|a\|_2^2, \qquad (9)$$

subject to $a_i \geq 0 \ \forall \ i$

In Equation (9), a non-negative input vector $x \in \mathbb{R}^N$ and a normalized non-negative dictionary matrix $D \in \mathbb{R}^{M \times N}$ are provided. In some implementations, the dictionary matrix may contains the "features" of the data, such as features learned from the data (e.g., by another learning algorithm, such as deep learning algorithm implemented using a different SNN also implemented on the same neuromorphic computing device, among other examples). The dictionary matrix is programmed as synaptic weights in the SNN. The optimization problem finds a non-negative vector $a \in \mathbb{R}^M$ that minimizes the loss function L(a). $\lambda_1$ and $\lambda_2$ are nonnegative regularization parameters determined by applications.

Figure 9A:
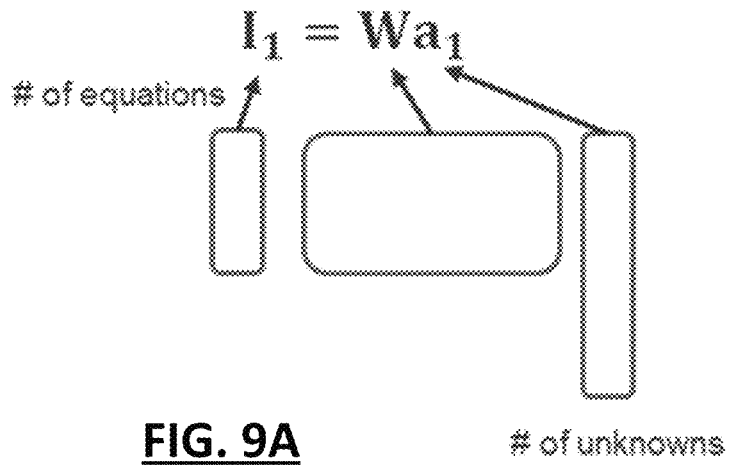
FIG. 9A is a representation of an example over complete problem.
Figure 9B:
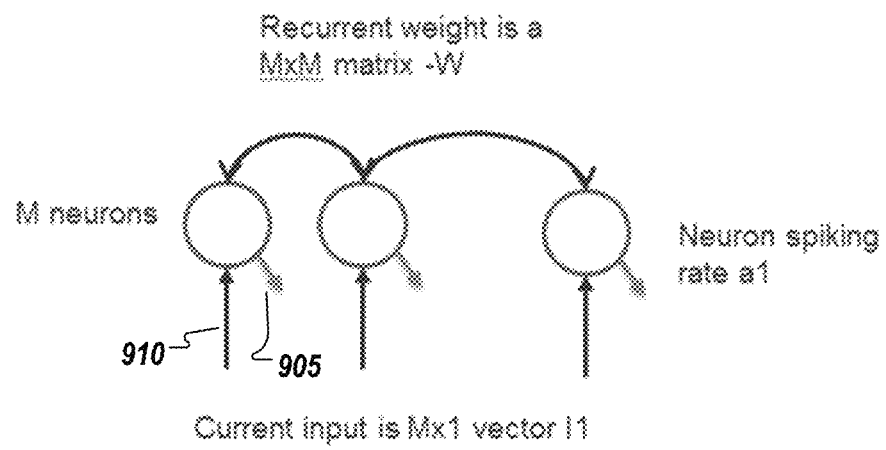
FIG. 9B is a simplified block diagram illustrating a portion of a first example spiking neural network (SNN) configured to solve a sparse coding problem.

Turning to FIG. 9A, in some cases, matrix inverse problems may present themselves as over-complete inverse problems, where there are a larger number of unknowns (e.g., vector $a_1$) than equations. For instance, the dimensions of the $l_1$ and W, discussed in other examples of matrix inverse problems above, may be smaller in dimension than the dimension of $a_1$. The result is that multiple solutions may be determined when solving:

$Wa_1 = l_1$, such that multiple vectors $a_1$ may be determined that satisfy the equation. In some cases, it may be desirable to select an optimized one of the multiple potential solutions in the over-complete inverse problem. For instance, optimization of the problem may be presented as a sparse coding problem In one example, SNNs generated using a configurable neuromorphic computing device support the addition of negative feedback into the SNN to promote the selection of a sparse solution. For instance, as illustrated in FIG. 9B, leakage or a negative bias current (e.g., 905), may be introduced to dampen currents or spikes input (e.g., at 910) to neurons in the SNN. The introduction of a bias current or leakage may cause many neurons to stay inactive, and transform the equation to $I_1 - Wa_1 - I_b = 0$ for the active neurons, alternatively represented by the matrix inverse problem $a_1 = W^{-1}(I_1 - I_b)$, which may serve as the basis of the Elastic Net and other sparse coding problems.

By properly configuring a spiking neural network, there may be multiple ways to solve Equation (9) (and other similar matrix inverse regression, optimization, and sparse coding problems) using a configurable neuromorphic computing device, such as described in the examples herein. For instance, Equation (9) may be reduced to the least absolute shrinkage and selection operator (LASSO) regression problem by setting $\lambda_2 = 0$, or to the least-squares regression problem by setting $\lambda_1 = 0$. A configurable neuromorphic computing device configured to implement digital artificial neuron may be configured to establish an SNN. During configuration of the SNN, a programmer or system may provide SNN definition data defining the connections and parameters of neurons in the SNN. For instance, during configuration, both $\lambda_1$ and $\lambda_2$ may be defined and given as inputs, together with the dictionary matrix D, input x, and other parameters.

Figure 10:
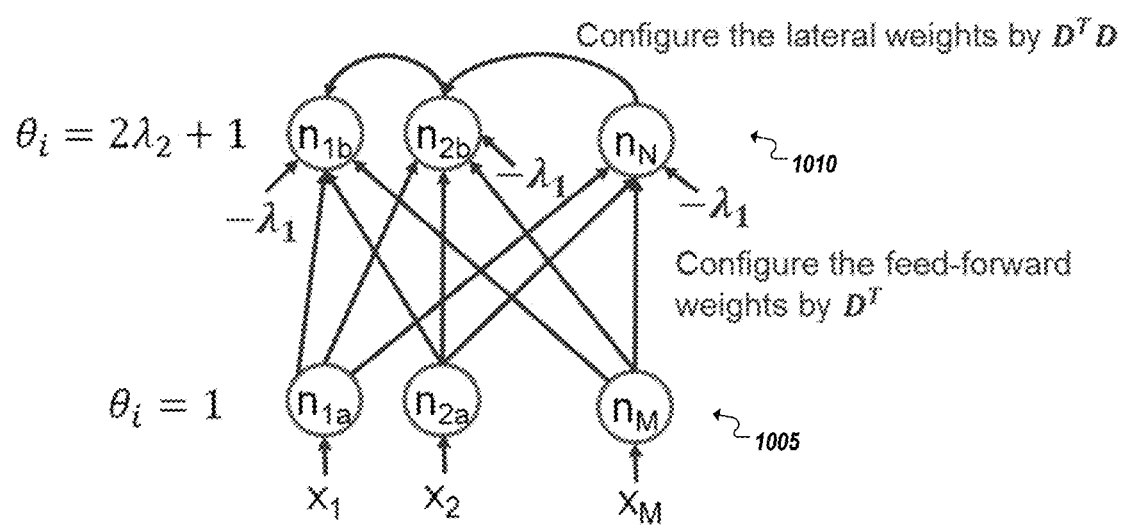
FIG. 10 is a simplified block diagram illustrating a portion of a second example spiking neural network (SNN) configured to solve a sparse coding problem.

In one example, shown in simplified block diagram 1000 of FIG. 10, a two layered SNN may be defined and implemented by a configurable neuromorphic computing device to model and solve Equation (9). A first layer of neurons 1005 may be provided to accept the input vector x. A first potential threshold $\theta_i$ may be provided, where $\theta_i = 1$. Feedforward synapses may be provided to connect from each of the first layer neurons 1005 to a second, top layer of recurrently connected neurons 1010. The feedforward synapses may be configured with feed-forward weight values corresponding to values of in an instance of Equation (9). Further, the neurons 1010 in the top layer may be configured with firing potential threshold parameters equal to $\theta = 2\lambda_2 + 1$. The synaptic weights of the recurrent synapses connecting the top layer neurons 1010 (e.g., $n_{1b}, n_{2b}, n_N$, etc.) may be set to correspond to the values of $D^T D$. With such an SNN implemented using the neuromorphic computing device, an input vector x may be provided and the SNN may be run until a steady state is observed. Spiking rates of the top layer neurons 1010 may be monitored, and the spike rate values observed at steady state may be adopted or interpreted as the solution a of the problem.

In another example, an SNN configured to solve a sparse code, or Elastic Net, problem may be implemented as a one-layer recurrently connected SNN (similar to the network illustrated in the simplified example in FIG. 4C). For instance, an SNN may be configured using the neuromorphic computing device such that a network of N neurons are implemented and interconnected with all-to-all connectivity and up to $N^2$ synapses. The parameters of the SNN (e.g., D, $\lambda_1$ and $\lambda_2$, x, etc.) may be configured according to the Elastic Net problem. For the one-layer network, an input may be provided and spiking (or firing) rates of the N neurons may be observed until the network dynamics stabilizes. The steady state firing rates of neurons $n_1, n_2$ to $n_N$ may then be interpreted to represent the desired solution $a = [a_1, a_2, \ldots, a_N]$.

To solve for the Elastic Net problem, the network configurations (e.g., for the neurons and synapses) may be adopted according to the variables:

$$b \overset{\text{def}}{=} D^T x,$$

$$G \overset{\text{def}}{=} D^T D - I$$

where 1 is an identity matric (e.g., a matrix of ones in diagonal and zeros in all other matrix elements) Further, in this example, for each neuron a single dendritic compartment may be used, i.e. s=1. The parameters of each neuron $n_i$ may be configured as:

$$I^{bias} = b_i - \lambda_1, \theta = 2\lambda_2 + 1, \tau_s = c_1, \tau_m = c_1 \quad (10)$$

where $I^{bias}$ is the bias current of the neuron, $\theta$ is the firing potential threshold, $\tau_s$ is the synaptic decay time constant, and $\tau_m$ is the membrane decay time constant. Further, the synaptic weights of a synapse from neuron $n_j$ to neuron $n_i$ may be set to:

$$W_{ij} = \frac{-G_{ij}}{c_1} \quad (11)$$

where $c_1$ in (10) and (11) is a free variable that controls the convergence rate of the SNN. While the SNN may converge faster with a smaller $c_1$, this involves a smaller time step size for proper approximation. As noted above, a one-layer implementation of an Elastic Net SNN solver may involve the pre-computation of the vector variable b. In some implementations, a neuromorphic computing device may be provided with additional resources to perform these pre-computations. In other examples, such pre-computations may be performed with additional hardware for such arithmetic computations, and the results of these computations may be used in the configuration of an SNN implemented using the neuromorphic computing device, among other example implementations.

Figure 11:
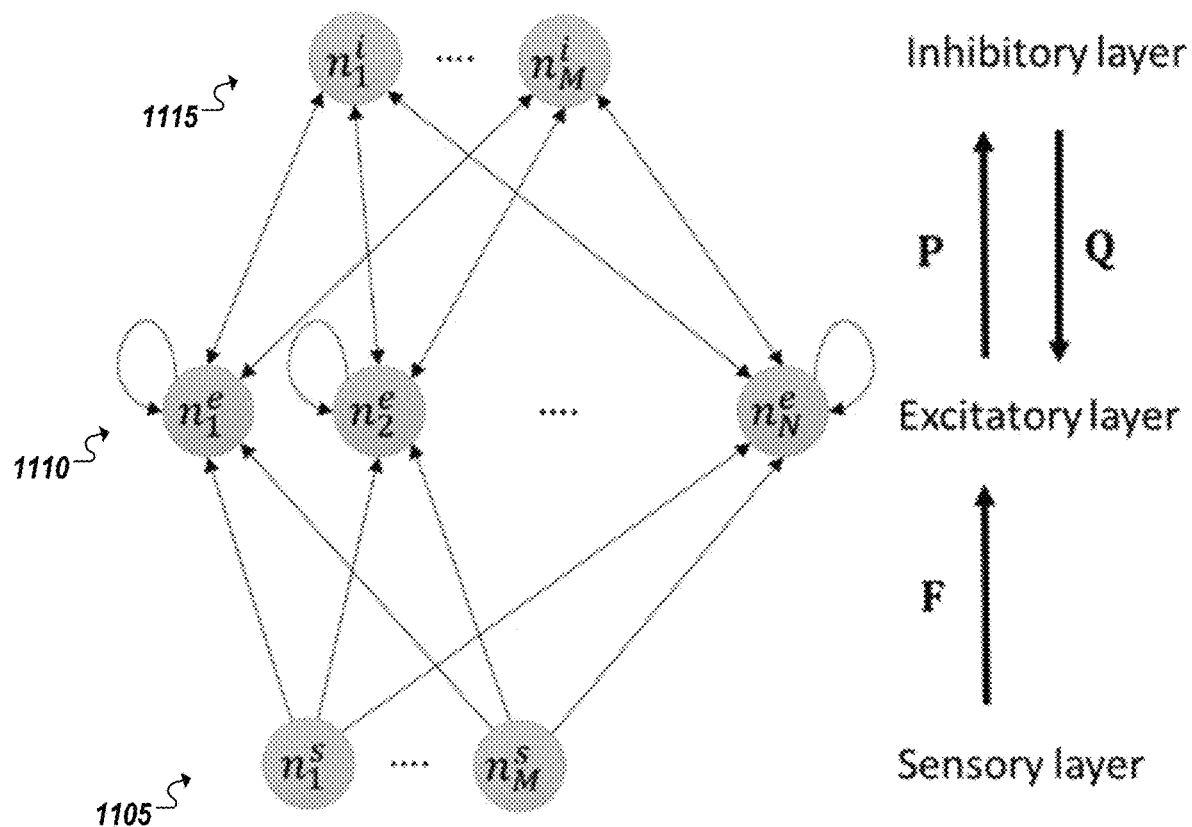
FIG. 11 is a simplified block diagram illustrating a portion of a third example spiking neural network (SNN) configured to solve a sparse coding problem.

In another example, the pre-computation of b may be mitigated by implementing and configuring a three-layer SNN 1100 to solve an Elastic Net or sparse code problem. For instance, as shown in FIG. 11, an SNN may be implemented using a neuromorphic computing device that is constructed from 2M+N neurons, with M neurons 1105 in a sensory layer, N neurons 1110 in an excitatory layer, and M neurons 1115 in an inhibitory layer. In one implementation, a total of 3MN+N synapses may be provided, with M*N feedforward synapses formed from the sensory layer neurons 1105 to excitatory layer neurons 1110, with the weights denoted as $F \in \mathbb{R}^{N \times M}$. 2*M*N synapses may be defined are in both directions between the excitatory layer neurons 1110 and the inhibitory layer neurons 1115, with the weights denoted as $P \in \mathbb{R}^{M \times N}$ and $Q \in \mathbb{R}^{N \times M}$, respectively. For the excitatory layer neurons 1110, each has an additional synapse connected back to itself, with the weights of these N synapses denoted as a diagonal matrix $S \in \mathbb{R}^{N \times N}$ A three layer SNN implementation, such as shown in FIG. 11, may reduce the number of synapses from $N^2$ in the one layer recurrently connected model to 3MN+N. This reduction may be important in some implementations. For instance, in some cases, a sparse coding problem may be dimensioned such that N»M, and the resulting $N^2$ synapses of a one-layer network may be too large a number to implement using a particular neuromorphic computing device's hardware, among other example considerations.

In this particular example of FIG. 11, an input vector $x \Delta \mathbb{R}^N$ may be defined and provided to the sensory layer neurons, and the SNN 1100 may be permitted to run until a steady state is reached. Spiking rates of the excitatory layer neurons 1110 may be observed, and when the network dynamics stabilize, the desired solution $a = [a_1, a_2, \ldots, a_N]$ can be read out as the spiking rate of excitatory layer neurons $n_1^e, n_2^e$ to $n_N^e$ (910), respectively. Further, the sensory layer neurons 1105 may be configured to send out spikes at a constant rate. The rate is set the same as the input vector x, e.g., the firing rate of $n_1^s$ is $x_1$, the firing rate of $n_2^s$ is $x_2$, and so on. Note that this behavior can be implemented using the neuron model described in connection with Equations (5)-(8). In other implementations, sensory layer neurons 1105 may be replaced by a spike generator configured to simply inject spikes periodically on synapses towards the excitatory layer neurons 1110 without implementing the sensory layer neurons 1105, among other examples. In the example of FIG. 11, the SNN may be defined such that three dendritic compartments are implemented for the excitatory layer neurons 1110. For instance, the first compartment, $u^1(t)$ may be defined to contain or correlate with synapses from the sensory layer, the second compartment, $u^2(t)$, may be defined to contain or correlate synapses from the inhibitory layer, and the third compartment, $u^3(t)$, may be defined to contain or correlate synapses originating from itself. Further, in this example, the neuron parameters of the excitatory layer may be configured to be:

$$I^{bias} = -\lambda_1, \theta = 2\lambda_2 + 1, \tau_s^1 = c_1,$$

$$\tau_s^2 = c_2, \tau_s^3 = c_3, \tau_m \gg c_1, c_2, c_3 \quad (12)$$

For the inhibitory layer neurons, a single dendritic compartment may be defined, with configurations:

$$I^{bias} = 0, \theta = 1, \tau_s = c_2, \tau_m \gg c_2 \quad (13)$$

and synaptic weights of the synapses F, P, Q and S (shown in FIG. 11) are configured as $$F = \frac{D^T}{c_1}, P = \frac{D}{c_2}, Q = \frac{-D^T}{c_2}, S = \frac{1}{c_3} \quad (14)$$

where S is a matrix for the weights of the synapses connecting the excitatory neurons to themselves, I is an identity matrix and variables $c_1$, $c_2$, $c_3$ are set again as free variables to control convergence rate of the SNN. In some implementations, the value of $c_1$ may be advantageously defined such that $c_1 > c_2$, $c_3$ to cause the inhibition to operate at a faster time-scale than feed-forward excitation. In some implementations, the values of $c_2$ and $c_3$ may be selected such that $c_3 > c_2$ to cause the self-excitation for compensation to operate at a slower time-scale. Further, utilizing multiple dendrites in neurons implemented using a neuromorphic computing device and defining different time-constants (e.g., $\tau_s$ and $\tau_m$) for each dendrite may help the SNN to converge more smoothly with fewer spikes (and less energy expended). If the hardware resources of the neuromorphic computing device (e.g., of single cores) are limited, a single dendritic compartment may instead be utilized with the free variable values selected to $c_1 = c_2 = c_3$, among other example implementations. Further synaptic weight values may be selected, for instance, between the excitatory and inhibitory layer that are not unique. One may choose different weight matrixes P, Q, S and choose a different number of neurons in the inhibitory layer, as long as the weights satisfy Equation (15):

$$c_2 PQ + c_3 S = -D^T D + I \quad (15)$$

In some implementations, a neuromorphic computing device may be provided with neuromorphic cores capable of implementing digital artificial neurons that may adopt an LIF neuron model. In some cases, the neuromorphic computing device may selectively implement LIF or non-LIF neurons. In an LIF neuron model, membrane leakage may be modeled, causing potential collected at the neuron soma to "leak" from the neuron. This membrane leakage may be leveraged to implement the negative bias current of an SNN implemented to solve sparse coding problems. For instance, the configuration for a one-layer SNN implementation, as set forth in Equation (10), may be alternatively implemented using LIF neurons according to Equation (16):

$$I^{bias} = b_i, \theta = 2\lambda_2 + 1, \tau_s = c_1, \tau_m = \frac{\theta}{\lambda_1} - \epsilon \quad (16)$$

where, $\epsilon$ is a small positive value for proper approximation. Similarly, the parameter configuration for the three-layer SNN introduced in FIG. 11 set forth in Equation (12) may be alternatively implemented using LIF neurons according to Equation (17):

$$I^{bias} = 0, \theta = 2\lambda_2 + 1, \tau_s^1 = c_1, \tau_s^2 = c_2, \tau_s^3 = c_3, \tau_m = \frac{\theta}{\lambda_1} - \epsilon \quad (17)$$

The Elastic Net sparse coding problem solved using the example SNNs discussed above may be used, for instance, to determine a feature set for use in a machine learning algorithm. In many cases, feature selection may present itself as an over complete inverse problem capable of being solved as a sparse coding problem. For instance, as illustrated in the example of FIG. 10, the matrix D may correspond to the set of all possible features, the firing rate of neuron $n_{1b}$, $n_{2b}$ to $n_N$ may represent the feature coefficient, and $x_1$ to $x_M$ representing the samples, or input. For instance, each input vector x may be implemented as a particular digital image vector, and the feature matrix may include features such as the discovery of a diagonal element, a human eye, a circular element, a human nose, sky, water, or other feature depending on the application. To determine an optimized set of features to be used in a machine learning model, the features coefficient vector may be found to drive selection and interpretation of the features D. The coefficient values $a_1$ may correspond to identifying those features that are most important in the sense that they correlate to the input values, with the most important features having the highest coefficients in the model, while features uncorrelated with the output variables having coefficient values close to zero. Utilizing one of the SNNs discussed in the examples above for solving an Elastic Net equation, the SNN may be run against a set of inputs in connection with the determination of a corresponding feature-based machine learning model. The feature coefficient values may later be used for classification, prediction, or other machine learning purposes. For example, a classifier can be trained by taking the data labels and their feature coefficients as input. When a data of unknown class is presented, the classifier can use its feature coefficients to classify. The classifier may be implemented on the neuromorphic computing device, or on another general purpose computer.

Figure 12C:
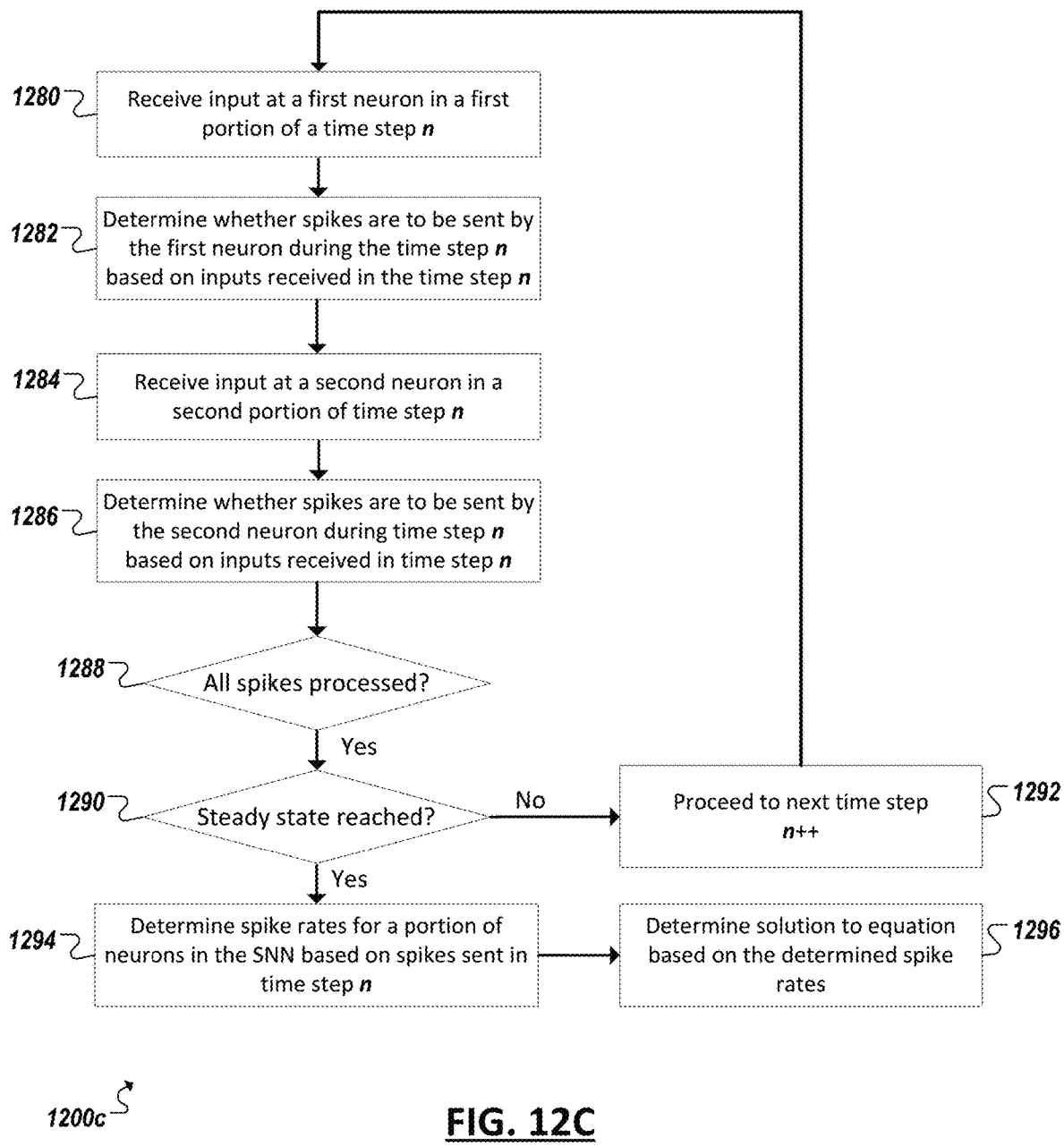

Other applications of sparse coding may include signal processing and compressive sensing. In signal processing, one can obtain the feature coefficients by solving the sparse coding problems, and use the feature coefficients to reconstruct the original signal using the dictionary matrix. Such reconstruction typically can reduce the noise presented in the given signal, and enhance its signal-to-noise ratio. The reconstruction may also recover missing or corrupted information in the given signal. In compressive sensing, one need to decompress the compressed measurements in order to obtain the desired measured signal. The decompression process can be realized by solving the sparse coding problem, where the dictionary matrix is replaced by the measurement matrix, and the signal reconstruction is obtained using the solved feature coefficients, among other examples FIGS. 12A-12C are flowcharts 1200a-c illustrating example techniques involving solving matrix inverse problems utilizing spiking neural networks. For instance, in the example of FIG. 12A, one or more inputs are received 1205 at a neuromorphic computing device to cause a particular spiking neural network (SNN) to be defined and implemented using neuromorphic cores of the neuromorphic computing device according to the definition. The SNN may include multiple artificial neurons connected by a plurality of artificial synapses. Weight values may be configured 1210 for each of the synapses. The assignment of weight values to respective individual synapses may be made to correlate to values in one or more matrices to be operated upon within the equation. Additionally parameters of the SNN may also be set to implement the particular SNN, such as neurons' firing thresholds, synaptic decay time constants, and membrane decay time constant, among other examples. The synapses, in some cases may be used to recurrently connect at least a portion of the synapses to correspond to the inversion of at least one of the one or more matrices. An input may be provided 1215 to the SNN, the input having values corresponding to a vector to be multiplied against one or more of the matrices in the equation. The SNN may be run 1220 based on the input until a steady state of the SNN is determined 1225 (e.g., from monitoring of spiking firing rates within the SNN (e.g., which may be determined by monitoring traffic on routers of the neuromorphic computing device implementing the SNN)). Spiking rates may converge for at least a particular portion of the neurons in the SNN at steady state, and these spiking rates may be determined 1230 and an approximate solution to the equation may be determined 1235 from the values of the spiking rates determined 1230 for the particular portion of neurons. In some cases, an outside process may be used to monitor traffic in the neuromorphic computing device to determine 1225 a steady state, determine 1230 spiking rates, and/or determine 1235 the approximate solution state. In other cases, such logic may be provided and programmed to be executed locally on the neuromorphic computing device, among other example implementations.

In the example of FIG. 12B, one or more inputs are received 1240 at a neuromorphic computing device to cause a particular spiking neural network (SNN) to be defined and implemented using neuromorphic cores of the neuromorphic computing device according to the definition. The SNN may include multiple artificial neurons connected by a plurality of artificial synapses. Weight values may be configured 1245 for each of the synapses. The assignment 1245 of weight values to respective individual synapses may be made to correlate to values in one or more matrices to be operated upon within the equation. At least a portion of the neurons in the SNN may be configured 1250 with attributes to negatively bias or impede the accumulation of spiking potential at the corresponding neuron. This may be used to encourage the SNN to behave in a manor to solve a sparse coding problem (e.g., to generate a sparse solution to an over complete problem represented by the equation). An input may be provided 1255 to the configured SNN and the SNN may be run 1260 based on the input until a steady state is determined 1265 to be reached in the SNN. Spiking rates of a particular portion of the SNN (e.g., all the neurons or a particular subset of neurons) may be determined 1270. These determined 1270 spiking rates may be utilized to determine 1275 a solution to the sparse coding problem.

In the example of FIG. 12C, a neuromorphic computing device may include a network of neuromorphic processing cores (e.g., each with a respective arithmetic processing unit and local memory) that may each be used to implement one or more artificial neurons and define synapses between the artificial neurons to construct an SNN. In the example of FIG. 12C, a single core of the neuromorphic computing device may implement multiple neurons within the SNN and may time multiplex access to the core's resources (e.g., processor resources) by the processes (e.g., dendritic and somatic modeling processes) used to implement each of the multiple neurons. Time steps may be defined and utilized with the neuromorphic computing device to synchronize the varied processes of the multiple core implementing the various neurons with an example SNN. For instance, to begin a time step, a neuromorphic core may provide for the neurons to send spikes that are to be sent (e.g., based on previously received presynaptic spikes). In some implementations, a time synchronization barrier process may be utilized by the neuromorphic computing device to guarantee that all spikes scheduled in the previous time step have been delivered before moving to the next time step. Spikes may arrive at neurons in the SNN in arbitrary sequential order, and cause subsequent dendrite and soma process at the receiving neurons (e.g., all in the same time step). For instance, a first one of multiple neurons concurrently implemented by the core may first send any spikes it is to send. Inputs (e.g., provided to the neuron as part of an input vector or as a spike message from another connected neuron) may then be received 1280 and processed. For instance, during a time step n=0, an input may be received 1280 at the first neuron and the corresponding neuromorphic core may determine 1282 (e.g., from previously received spikes, based on parameters configured for the first neuron) whether spikes are to be sent by the first neuron in response to inputs received during time step n=0 (e.g., if the firing potential threshold of the neuron has increased and been met during the time step). The core may then use time multiplexing to turn to another, second one of the neurons implemented by the core during the same time step n=0 (i.e., but in another portion of the time step), process 1284 any inputs (e.g., external input currents or spike messages from other neurons in the SNN) and determine whether any such inputs caused the potential of the neuron to meet or exceed its firing threshold (and cause a spike to be sent (either in the same or an immediately subsequent time step, depending on the configuration of the SNN)). The core can continue dividing the time step and time multiplexing its processing resources until all of the neurons it implements in the SNN have been processed to identify any received presynaptic spikes and determine any resulting postsynaptic spikes. When all spikes are determined to be processed (e.g., 1288) the SNN may be monitored (e.g., by a process local to or remote from the neuromorphic computing device) to determine 1290 whether a steady state has been reached in the running SNN. If the steady state has not been reached, the SNN may be allowed to continue to run onto a next time step 1292 (e.g., n++, or n=1 in this example). In one implementation, the next time step may begin with the firing of spikes determined in the preceding time step, followed by the processing of spikes and determination of additional spikes (e.g., steps 1280, 1282, 1284, 1286, etc.) for each of the neurons implemented, or hosted, at a respective neuromorphic core. This may continue until a steady state is determined 1290 to be reached. Spiking rate values for a particular set of neurons within the SNN may be determined 1294 and a solution to an equation modeled by the SNN may be determined 1296 from the spike rate identified in the steady state.

Figure 13:
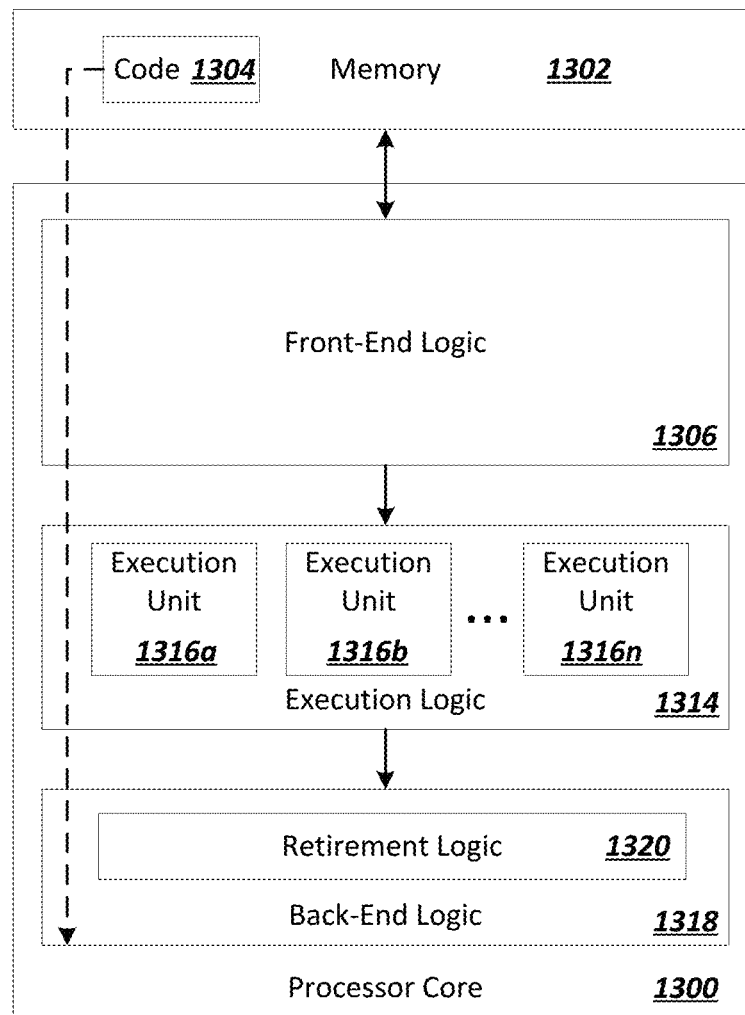
FIG. 13 is a block diagram of an exemplary processor in accordance with one embodiment.
Figure 14:
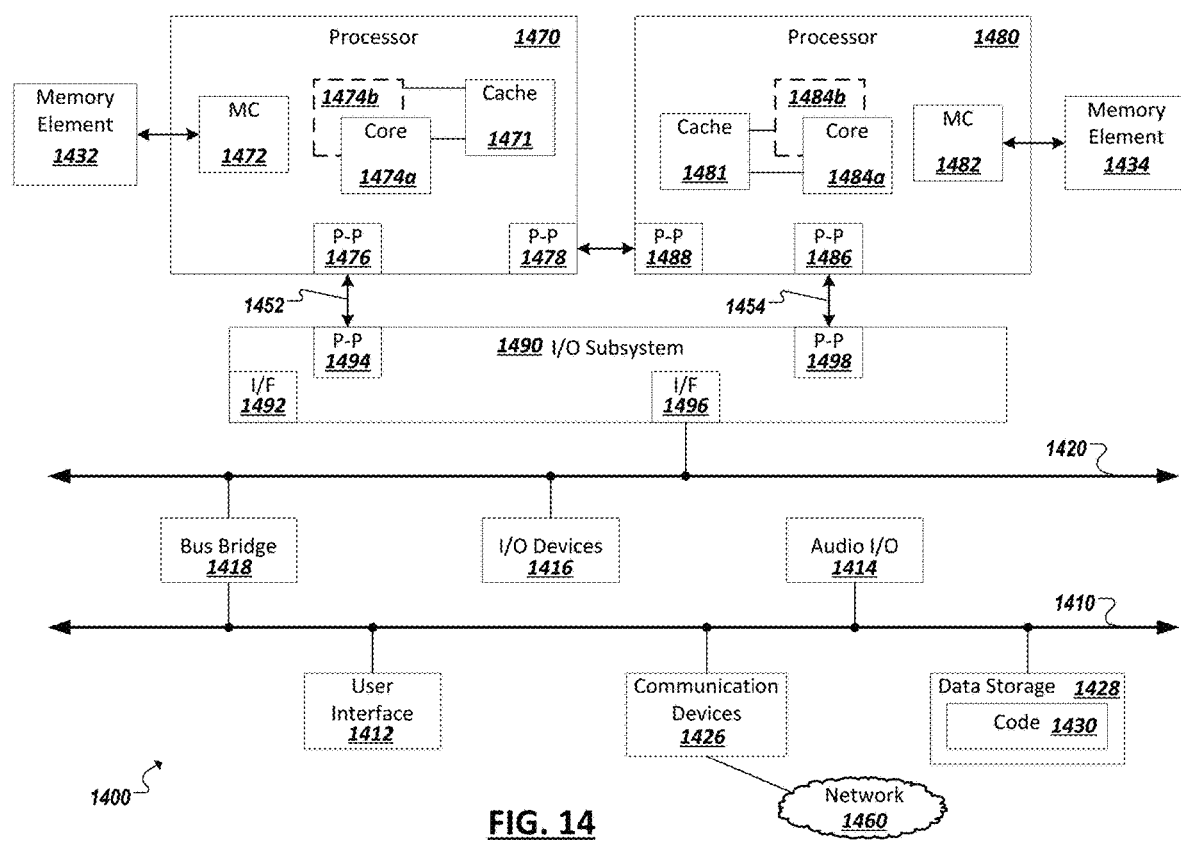
FIG. 14 is a block diagram of an exemplary computing system in accordance with one embodiment.

FIGS. 13-14 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 13-14.

FIG. 13 is an example illustration of a processor according to an embodiment. Processor 1300 is an example of a type of hardware device that can be used in connection with the implementations above. Processor 1300 may be any type of processor, such as a microprocessor, an embedded processor, a digital signal processor (DSP), a network processor, a multi-core processor, a single core processor, or other device to execute code. Although only one processor 1300 is illustrated in FIG. 13, a processing element may alternatively include more than one of processor 1300 illustrated in FIG. 13. Processor 1300 may be a single-threaded core or, for at least one embodiment, the processor 1300 may be multi-threaded in that it may include more than one hardware thread context (or "logical processor") per core.

FIG. 13 also illustrates a memory 1302 coupled to processor 1300 in accordance with an embodiment. Memory 1302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1300 can execute any type of instructions associated with algorithms, processes, or operations detailed herein. Generally, processor 1300 can transform an element or an article (e.g., data) from one state or thing to another state or thing.

Code 1304, which may be one or more instructions to be executed by processor 1300, may be stored in memory 1302, or may be stored in software, hardware, firmware, or any suitable combination thereof, or in any other internal or external component, device, element, or object where appropriate and based on particular needs. In one example, processor 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor 1300 can also include execution logic 1314 having a set of execution units 1316a, 1316b, 1316n, etc. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor 1300 allows out of order execution but requires in order retirement of instructions. Retirement logic 1320 may take a variety of known forms (e.g., re-order buffers or the like). In this manner, processor 1300 is transformed during execution of code 1304, at least in terms of the output generated by the decoder, hardware registers and tables utilized by register renaming logic 1310, and any registers (not shown) modified by execution logic 1314.

Although not shown in FIG. 13, a processing element may include other elements on a chip with processor 1300. For example, a processing element may include memory control logic along with processor 1300. The processing element may include I/O control logic and/or may include I/O control logic integrated with memory control logic. The processing element may also include one or more caches. In some embodiments, non-volatile memory (such as flash memory or fuses) may also be included on the chip with processor 1300.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems described herein may be configured in the same or similar manner as computing system 1400.

Processors 1470 and 1480 may also each include integrated memory controller logic (MC) 1472 and 1482 to communicate with memory elements 1432 and 1434. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface 1450 using point-to-point interface circuits 1478 and 1488, respectively. Processors 1470 and 1480 may each exchange data with a chipset 1490 via individual point-to-point interfaces 1452 and 1454 using point-to-point interface circuits 1476, 1486, 1494, and 1498. Chipset 1490 may also exchange data with a high-performance graphics circuit 1438 via a high-performance graphics interface 1439, using an interface circuit 1492, which could be a PtP interface circuit. In alternative embodiments, any or all of the PtP links illustrated in FIG. 14 could be implemented as a multi-drop bus rather than a PtP link.

Chipset 1490 may be in communication with a bus 1420 via an interface circuit 1496. Bus 1420 may have one or more devices that communicate over it, such as a bus bridge 1418 and I/O devices 1416. Via a bus 1410, bus bridge 1418 may be in communication with other devices such as a user interface 1412 (such as a keyboard, mouse, touchscreen, or other input devices), communication devices 1426 (such as modems, network interface devices, or other types of communication devices that may communicate through a computer network 1460), audio I/O devices 1414, and/or a data storage device 1428. Data storage device 1428 may store code 1430, which may be executed by processors 1470 and/or 1480. In alternative embodiments, any portions of the bus architectures could be implemented with one or more PtP links.

The computer system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, where the instructions when executed on a machine, cause the machine to: generate a plurality of artificial neurons, where at least a first portion of the plurality of neurons include attributes to inhibit accumulation of potential at the respective neuron responsive to spike messages to be received at the respective neuron; define, using one or more routing tables, a spiking neural network including the plurality of artificial neurons interconnected by a plurality of artificial synapses, where the spiking neural network is defined to correspond to one or more numerical matrices, each of the plurality of artificial synapses includes a respective weight value, and the weight values of at least a first portion of the plurality of artificial synapses are to be based on values in the one or more numerical matrices; provide, to the spiking neural network, a plurality of inputs, where the plurality of inputs are selected to correspond to a numerical vector; determine a spiking rate for at least a second portion of the plurality of artificial neurons based on the plurality of inputs; determine a steady state condition for the spiking neural network; and determine a sparse basis vector based on spike rate values determined for at least the second portion of the plurality of artificial neurons in the steady state condition.

Example 2 may include the subject matter of example 1, where generating the plurality of neurons includes setting parameters for each of the plurality of neurons.

Example 3 may include the subject matter of example 2, where the parameters include one or more of a firing potential threshold, a synaptic decay time constant, a membrane potential decay time constant, and a bias current.

Example 4 may include the subject matter of example 3, where the spiking neural network interconnects the plurality of neurons in a single layer, the plurality of neurons are recurrently connected using the plurality of artificial synapses, the first portion of the plurality of neurons and the second portion of the plurality of neurons include all of the plurality of neurons, and the plurality of inputs are provided to the plurality of neurons.

Example 5 may include the subject matter of example 4, where the bias current is based on a first regularization parameter $\lambda_1$, the firing potential threshold is to be set to a value $2\lambda_2+1$ where $\lambda_2$ includes a second regularization parameter, and the membrane potential decay time constant is set to be greater than the synaptic decay time constant.

Example 6 may include the subject matter of example 3, where the spiking neural network interconnects the plurality of neurons in three layers, neurons in a first one of the three layers are to connect to neurons in a second one of the three layers via feedforward connections using a first subset of the plurality of synapses, neurons in the second layer are to connect to neurons in a third one of the three layers via feedforward connections using a second subset of the plurality of synapses, neurons in the third layer are to connect to neurons in the second layer via feedback connections using a third subset of the plurality of synapses, and each of the neurons in the second layer is to connect to itself through synapses in a fourth subset of the plurality of synapses.

Example 7 may include the subject matter of example 6, where the bias current of each of the neurons in the second layer is set to a first regularization parameter $\lambda_1$, the firing potential threshold is to be set to a value $2\lambda_2+1$ where $\lambda_2$ includes a second regularization parameter, and the membrane potential decay time constant is to be set greater than the synaptic decay time constant.

Example 8 may include the subject matter of example 7, where each of the neurons in the second layer include three dendritic compartments, a first one of the dendritic compartments corresponds to synapses in the first subset of synapses, a second one of the dendritic compartments corresponds to synapses in the second subset of synapses, and a third one of the dendritic compartments corresponds to synapses in the fourth subset of synapses.

Example 9 may include the subject matter of example 3, where the spiking neural network interconnects the plurality of neurons in two layers, neurons in a first one of the two layers are to connect to neurons in a second one of the two layers via feedforward connections using a first subset of the plurality of synapses, neurons in the second layer are to connect to other neurons in the second layer via recurrent connections using a second subset of the plurality of synapses.

Example 10 may include the subject matter of example 9, where the firing potential threshold of neurons in the first layer is to be set to a value 1, and the firing potential threshold of neurons in the second layer is to be set to a value $2\lambda_2+1$ where $\lambda_2$ includes a regularization parameter.

Example 11 may include the subject matter of any one of examples 2-10, where the attributes to inhibit the accumulation of potential are based on a respective value of the bias current parameter for the corresponding neuron.

Example 12 may include the subject matter of any one of examples 1-11, where the first portion of the plurality of artificial neurons include neurons based on a Leaky Integrate-and-Fire (LIF) neuron model including a leakage attribute, and the attributes to inhibit the accumulation of potential include the leakage attribute.

Example 13 may include the subject matter of any one of examples 1-12, where the spiking neural network is implemented using a neuromorphic computing device including a network of neuromorphic cores.

Example 14 may include the subject matter of example 13, where the network of neuromorphic cores includes: a plurality of neuromorphic cores, each neuromorphic core in the plurality of neuromorphic cores includes a respective processing resource and logic to implement one or more artificial neurons; one or more routers to route spiking messages between artificial neurons implemented using the plurality of neuromorphic cores; and memory including data to define interconnections of the plurality of artificial neurons in the spiking neural network.

Example 15 may include the subject matter of example 14, where each neuromorphic core is to implement two or more of the plurality of artificial neurons.

Example 16 may include the subject matter of example 15, where the neuromorphic cores time multiplexes access to the processing resources of the respective neuromorphic core to concurrently implement the two or more artificial neurons.

Example 17 may include the subject matter of example 13, where the network of neuromorphic cores are configurable to implement any one of a plurality of different spiking neural networks.

Example 18 may include the subject matter of any one of examples 1-17, where the numerical matrix includes a matrix D in an equation:

$$\min_a L(a) = \frac{1}{2}\|x - Da\|_2^2 + \lambda_1\|a\|_1 + \lambda_2\|a\|_2^2,$$

where x includes the input vector, a includes a vector corresponding to the spiking rates of the particular portion of the artificial neurons, $\lambda_1$ includes a first regularization parameter, and $\lambda_2$ includes a second regularization parameter.

Example 19 is a method including: generating a plurality of artificial neurons, where at least a first portion of the plurality of neurons include attributes to inhibit accumulation of potential at the respective neuron responsive to spike messages to be received at the neuron; defining, using one or more routing tables, a spiking neural network including the plurality of artificial neurons interconnected by a plurality of artificial synapses, where the spiking neural network is defined to correspond to a numerical matrix, each of the plurality of artificial synapses includes a respective weight value, and the weight values of at least a first portion of the plurality of artificial synapses are to be based on values in the numerical matrix; providing, to the spiking neural network, a plurality of inputs, where the plurality of inputs are selected to correspond to a numerical vector; determining a steady state spiking rate for at least a second portion of the plurality of artificial neurons based on the plurality of inputs; and determining a sparse basis vector based on the steady state spiking rate values determined for at least the second portion of the plurality of artificial neurons.

Example 20 may include the subject matter of example 19, where generating the plurality of neurons includes setting parameters for each of the plurality of neurons.

Example 21 may include the subject matter of example 20, where the parameters include one or more of a firing potential threshold, a synaptic decay time constant, a membrane potential decay time constant, and a bias current.

Example 22 may include the subject matter of example 21, where the spiking neural network interconnects the plurality of neurons in a single layer, the plurality of neurons are recurrently connected using the plurality of artificial synapses, the first portion of the plurality of neurons and the second portion of the plurality of neurons include all of the plurality of neurons, and the plurality of inputs are provided to the plurality of neurons.

Example 23 may include the subject matter of example 22, where the bias current is based on a first regularization parameter $\lambda_1$, the firing potential threshold is to be set to a value $2\lambda_2+1$ where $\lambda_2$ includes a second regularization parameter, and the membrane potential decay time constant is set to be greater than the synaptic decay time constant.

Example 24 The storage medium of Claim 21, where the spiking neural network interconnects the plurality of neurons in three layers, neurons in a first one of the three layers are to connect to neurons in a second one of the three layers via feedforward connections using a first subset of the plurality of synapses, neurons in the second layer are to connect to neurons in a third one of the three layers via feedforward connections using a second subset of the plurality of synapses, neurons in the third layer are to connect to neurons in the second layer via feedback connections using a third subset of the plurality of synapses, and each of the neurons in the second layer is to connect to itself through synapses in a fourth subset of the plurality of synapses.

Example 25 may include the subject matter of example 24, where the bias current of each of the neurons in the second layer is set to a first regularization parameter $\lambda_1$, the firing potential threshold is to be set to a value $2\lambda_2+1$ where $\lambda_2$ includes a second regularization parameter, and the membrane potential decay time constant is to be set greater than the synaptic decay time constant.

Example 26 may include the subject matter of example 25, where each of the neurons in the second layer include three dendritic compartments, a first one of the dendritic compartments corresponds to synapses in the first subset of synapses, a second one of the dendritic compartments corresponds to synapses in the second subset of synapses, and a third one of the dendritic compartments corresponds to synapses in the fourth subset of synapses.

Example 27 may include the subject matter of example 21, where the spiking neural network interconnects the plurality of neurons in two layers, neurons in a first one of the two layers are to connect to neurons in a second one of the two layers via feedforward connections using a first subset of the plurality of synapses, neurons in the second layer are to connect to other neurons in the second layer via recurrent connections using a second subset of the plurality of synapses.

Example 28 may include the subject matter of example 27, where the firing potential threshold of neurons in the first layer is to be set to a value 1, and the firing potential threshold of neurons in the second layer is to be set to a value $2\lambda_2+1$ where $\lambda_2$ includes a regularization parameter.

Example 29 may include the subject matter of example 20, where the attributes to inhibit the accumulation of potential are based on a respective value of the bias current parameter for the corresponding neuron.

Example 30 may include the subject matter of any one of examples 19-29, where the first portion of the plurality of artificial neurons include neurons based on a Leaky Integrate-and-Fire (LIF) neuron model including a leakage attribute, and the attributes to inhibit the accumulation of potential include the leakage attribute.

Example 31 may include the subject matter of any one of examples 19-30, where the spiking neural network is implemented using a neuromorphic computing device including a network of neuromorphic cores.

Example 32 may include the subject matter of example 31, where the network of neuromorphic cores includes: a plurality of neuromorphic cores, each neuromorphic core in the plurality of neuromorphic cores includes a respective processing resource and logic to implement one or more artificial neurons; one or more routers to route spiking messages between artificial neurons implemented using the plurality of neuromorphic cores; and memory including data to define interconnections of the plurality of artificial neurons in the spiking neural network.

Example 33 may include the subject matter of example 32, where each neuromorphic core is to implement two or more of the plurality of artificial neurons.

Example 34 may include the subject matter of example 33, where the neuromorphic cores time multiplexes access to the processing resources of the respective neuromorphic core to concurrently implement the two or more artificial neurons.

Example 35 may include the subject matter of any one of examples 19-34, where the plurality of neuromorphic cores are configurable to implement any one of a plurality of different spiking neural networks.

Example 36 may include the subject matter of any one of examples 19-35, where the numerical matrix includes a matrix D in an equation:

$$\min_{a} L(a) = \frac{1}{2}\|x - Da\|_2^2 + \lambda_1\|a\|_1 + \lambda_2\|a\|_2^2,$$

where x includes the input vector, a includes a vector corresponding to the spiking rates of the particular portion of the artificial neurons, $\lambda_1$ includes a first regularization parameter, and $\lambda_2$ includes a second regularization parameter.

Example 37 is an apparatus including: a neuromorphic computing device including: one or more routers; a plurality of neuromorphic cores interconnected by the one or more routers, where each neuromorphic core in the plurality includes: a processor; a memory to store one or more routing tables; and logic to implement one or more artificial neurons to be hosted by the neuromorphic core, where each of the artificial neurons includes a respective dendrite process and a respective soma process to be executed using the processor, where the one or more routing tables define synapses to interconnect the artificial neurons to define a spiking neural network including the artificial neurons, the spiking neural network is defined to correspond to a numerical matrix, each of the plurality of artificial synapses has a respective weight value, and the weight values of at least a first portion of the plurality of artificial synapses are to be based on values in the numerical matrix. The apparatus may further include logic to: provide an input vector to the spiking neural network; and determine, from a steady state of the spiking neural network, spiking rates of a particular portion of the artificial neurons to represent a solution to a sparse coding problem corresponding to the numerical matrix.

Example 38 may include the subject matter of example 37, where the plurality of neuromorphic cores are configurable to implement any one of a plurality of different spiking neural networks.

Example 39 may include the subject matter of example 37, where the numerical matrix includes a matrix D in an equation:

$$\min_{a} L(a) = \frac{1}{2}\|x - Da\|_2^2 + \lambda_1\|a\|_1 + \lambda_2\|a\|_2^2,$$

where x includes the input vector, a includes a vector corresponding to the spiking rates of the particular portion of the artificial neurons, $\lambda_1$ includes a first regularization parameter, and $\lambda_2$ includes a second regularization parameter.

Example 40 may include the subject matter of any one of examples 37-39, where generating the plurality of neurons includes setting parameters for each of the plurality of neurons.

Example 41 may include the subject matter of example 40, where the parameters include one or more of a firing potential threshold, a synaptic decay time constant, a membrane potential decay time constant, and a bias current.

Example 42 may include the subject matter of example 41, where the spiking neural network interconnects the plurality of neurons in a single layer, the plurality of neurons are recurrently connected using the plurality of artificial synapses, the first portion of the plurality of neurons and the second portion of the plurality of neurons include all of the plurality of neurons, and the plurality of inputs are provided to the plurality of neurons.

Example 43 may include the subject matter of example 42, where the bias current is based on a first regularization parameter $\lambda_1$, the firing potential threshold is to be set to a value $2\lambda_2+1$ where $\lambda_2$ includes a second regularization parameter, and the membrane potential decay time constant is set to be greater than the synaptic decay time constant.

Example 44 may include the subject matter of example 41, where the spiking neural network interconnects the plurality of neurons in three layers, neurons in a first one of the three layers are to connect to neurons in a second one of the three layers via feedforward connections using a first subset of the plurality of synapses, neurons in the second layer are to connect to neurons in a third one of the three layers via feedforward connections using a second subset of the plurality of synapses, neurons in the third layer are to connect to neurons in the second layer via feedback connections using a third subset of the plurality of synapses, and each of the neurons in the second layer is to connect to itself through synapses in a fourth subset of the plurality of synapses.

Example 45 may include the subject matter of example 44, where the bias current of each of the neurons in the second layer is set to a first regularization parameter $\lambda_1$, the firing potential threshold is to be set to a value $2\lambda_2+1$ where $\lambda_2$ includes a second regularization parameter, and the membrane potential decay time constant is to be set greater than the synaptic decay time constant.

Example 46 may include the subject matter of example 45, where each of the neurons in the second layer include three dendritic compartments, a first one of the dendritic compartments corresponds to synapses in the first subset of synapses, a second one of the dendritic compartments corresponds to synapses in the second subset of synapses, and a third one of the dendritic compartments corresponds to synapses in the fourth subset of synapses.

Example 47 may include the subject matter of example 41, where the spiking neural network interconnects the plurality of neurons in two layers, neurons in a first one of the two layers are to connect to neurons in a second one of the two layers via feedforward connections using a first subset of the plurality of synapses, neurons in the second layer are to connect to other neurons in the second layer via recurrent connections using a second subset of the plurality of synapses.

Example 48 may include the subject matter of example 47, where the firing potential threshold of neurons in the first layer is to be set to a value 1, and the firing potential threshold of neurons in the second layer is to be set to a value $2\lambda_2+1$ where $\lambda_2$ includes a regularization parameter.

Example 49 may include the subject matter of example 40, where the attributes to inhibit the accumulation of potential are based on a respective value of the bias current parameter for the corresponding neuron.

Example 50 may include the subject matter of any one of examples 37-49, where the first portion of the plurality of artificial neurons include neurons based on a Leaky Integrate-and-Fire (LIF) neuron model including a leakage attribute, and the attributes to inhibit the accumulation of potential include the leakage attribute.

Example 51 may include the subject matter of any one of examples 37-50, where the spiking neural network is implemented using a neuromorphic computing device including a network of neuromorphic cores.

Example 52 may include the subject matter of example 51, where the network of neuromorphic cores includes: a plurality of neuromorphic cores, each neuromorphic core in the plurality of neuromorphic cores includes a respective processing resource and logic to implement one or more artificial neurons; one or more routers to route spiking messages between artificial neurons implemented using the plurality of neuromorphic cores; and memory including data to define interconnections of the plurality of artificial neurons in the spiking neural network.

Example 53 may include the subject matter of example 52, where each neuromorphic core is to implement two or more of the plurality of artificial neurons.

Example 54 may include the subject matter of example 53, where the neuromorphic cores time multiplexes access to the processing resources of the respective neuromorphic core to concurrently implement the two or more artificial neurons.

Example 55 is a machine accessible storage medium having instructions stored thereon, where the instructions when executed on a machine, cause the machine to: define, using one or more routing tables, a particular spiking neural network (SNN) including a plurality of artificial neurons interconnected by a plurality of artificial synapses, where the particular SNN is defined to correspond to one or more numerical matrices in an equation, each of the plurality of artificial synapses includes a respective weight value, and the weight values of the plurality of artificial synapses correspond to values in the one or more numerical matrices; provide, to the particular SNN, a plurality of inputs, where the plurality of inputs are selected to correspond to a numerical vector in the equation; determine a spiking rate for at least a portion of the plurality of artificial neurons based on the plurality of inputs; determine a steady state condition for the particular SNN; and determine an approximate result for the equation based on the spiking rate values determined for at least the portion of the plurality of artificial neurons in the steady state condition, where the equation includes multiplication of an inverse of at least one of the numerical matrices.

Example 56 may include the subject matter of example 55, where the number of neurons in the plurality of neurons is based on dimensions of a particular one of the numerical matrices, and the number of inputs corresponds to a dimension of the numerical vector.

Example 57 may include the subject matter of any one of examples 55-56, where the particular SNN is implemented using a neuromorphic computing device including a network of neuromorphic cores.

Example 58 may include the subject matter of example 57, where the network of neuromorphic cores includes: a plurality of neuromorphic cores, where each neuromorphic core in the plurality of neuromorphic cores includes a respective processing resource and logic to implement one or more artificial neurons; one or more routers to route spiking messages between artificial neurons implemented using the plurality of neuromorphic cores; and memory including data to define interconnections of the plurality of artificial neurons in the particular SNN.

Example 59 may include the subject matter of example 58, where the data includes: the one or more routing tables to define connections between the plurality of artificial neurons corresponding to the plurality of artificial synapses; and the weight values assigned to each of the plurality of artificial synapses.

Example 60 may include the subject matter of any one of examples 58-59, where each neuromorphic core is to implement two or more of the plurality of artificial neurons.

Example 61 may include the subject matter of example 60, where the neuromorphic cores time multiplex access to the processing resources of the respective neuromorphic core to concurrently implement the two or more artificial neurons.

Example 62 may include the subject matter of example 57, where the neuromorphic computing device includes an interface to accept programming inputs to configure the network of neuromorphic cores to implement any one of a plurality of different spiking neural networks including the particular SNN.

Example 63 may include the subject matter of example 55-62, where defining the particular SNN includes generating the plurality of neurons, defining the one or more routing tables, setting the weight values of the plurality of artificial synapses, and setting values of parameters for the plurality of neurons.

Example 64 may include the subject matter of example 63, where the parameters include one or more of a firing potential threshold, a synaptic decay time constant, a membrane potential decay time constant, and a bias current.

Example 65 may include the subject matter of example 55-64, where the numerical matrix includes a sparse matrix.

Example 66 may include the subject matter of example 55-65, where the particular SNN includes a first set of the plurality of neurons, and each of the first set of neurons is recurrently connected with other neurons in the first set using a first set of the plurality of synapses.

Example 67 may include the subject matter of example 66, where the equation includes $a_2=WI_1$, where W includes the one or more matrices, l includes the input vector, and a includes a vector corresponding to the spiking rate values determined for at least the portion of the plurality of artificial neurons in the steady state condition.

Example 68 may include the subject matter of example 66-67, where the first set of the plurality of neurons includes a first subset of the plurality of neurons, the first set of the plurality of synapses includes a first subset of the plurality of synapses, the particular SNN includes a second subset of the plurality of neurons, the neurons in the second subset of neurons are feedforward connected to the neurons in the first subset through a second subset of the plurality of synapses, and the neurons in the second subset is recurrently connected with other neurons in the second subset using a third subset of the plurality of synapses.

Example 69 may include the subject matter of example 68, where the equation includes $r=C^{-1}BA^{-1}y$, where A includes a first one of the one or more matrices, B includes a second one of the one or more matrices, C includes a third one of the one or more matrices, y includes the input vector, r includes a vector corresponding to the spiking rate values determined for neurons in the second subset of neurons in the steady state condition, weight values of synapses in the first subset of synapses correspond to values of matrix A, weight values of synapses in the second subset of synapses correspond to values of matrix B, and weight values of synapses in the third subset of synapses correspond to values of matrix C.

Example 70 may include the subject matter of example 66-69, where the first set of the plurality of neurons includes a first subset of the plurality of neurons, the first set of the plurality of synapses includes a first subset of the plurality of synapses, the particular SNN includes a second subset of the plurality of neurons, each of the neurons in the second subset of neurons is feedforward connected to each of the neurons in the first subset through a second subset of the plurality of synapses, and each of the neurons in the second subset is recurrently connected with other neurons in the second subset using a third subset of the plurality of synapses.

Example 71 may include the subject matter of example 70, where the equation includes $r=C^{-1}BA^{-1}y$, where A includes a first one of the one or more matrices, B includes a second one of the one or more matrices, C includes a third one of the one or more matrices, y includes the input vector, r includes a vector corresponding to the spiking rate values determined for neurons in the second subset of neurons in the steady state condition, weight values of synapses in the first subset of synapses correspond to values of matrix A, weight values of synapses in the second subset of synapses correspond to values of matrix B, and weight values of synapses in the third subset of synapses correspond to values of matrix C.

Example 72 is method including: receiving one or more inputs to define a particular spiking neural network (SNN), where definition of the particular SNN includes definition of a number of digital artificial neurons to be implemented by a neuromorphic computing device, definition of a routing table to define a plurality of artificial synapses corresponding to interconnections of the number of neurons in the particular SNN, and definition of weight values for each of the plurality of synapses, where the weight values of the plurality of synapses correspond to values in the one or more numerical matrices; generating the particular SNN on the neuromorphic computing device based on the one or more inputs; receiving an input to the particular SNN including a vector, where the vector corresponds to a numerical vector in the equation; running the particular SNN based on the input; determining a steady state condition of the particular SNN; determining spiking rate values for at least a portion of the plurality of artificial neurons based on the plurality of inputs; and determining an approximate result for the equation based on the spiking rate values of the portion of the plurality of artificial neurons in the steady state condition, where the equation includes multiplication of the particular vector with an inverse of at least one of the numerical matrices.

Example 73 may include the subject matter of example 72, where the number of neurons in the plurality of neurons is based on dimensions of a particular one of the numerical matrices, and the number of inputs corresponds to a dimension of the numerical vector.

Example 74 may include the subject matter of any one of examples 72-73, where the particular SNN is implemented using a neuromorphic computing device including a network of neuromorphic cores.

Example 75 may include the subject matter of example 74, where the network of neuromorphic cores includes: a plurality of neuromorphic cores, where each neuromorphic core in the plurality of neuromorphic cores includes a respective processing resource and logic to implement one or more artificial neurons; one or more routers to route spiking messages between artificial neurons implemented using the plurality of neuromorphic cores; and memory including data to define interconnections of the plurality of artificial neurons in the particular SNN.

Example 76 may include the subject matter of example 75, where the data includes: the one or more routing tables to define connections between the plurality of artificial neurons corresponding to the plurality of artificial synapses; and the weight values assigned to each of the plurality of artificial synapses.

Example 77 may include the subject matter of any one of examples 75-76, where each neuromorphic core is to implement two or more of the plurality of artificial neurons.

Example 78 may include the subject matter of example 77, where the neuromorphic cores time multiplex access to the processing resources of the respective neuromorphic core to concurrently implement the two or more artificial neurons.

Example 79 may include the subject matter of example 74, where the neuromorphic computing device includes an interface to accept programming inputs to configure the network of neuromorphic cores to implement any one of a plurality of different spiking neural networks including the particular SNN.

Example 80 may include the subject matter of any one of examples 72-79, where defining the particular SNN includes generating the plurality of neurons, defining the one or more routing tables, setting the weight values of the plurality of artificial synapses, and setting values of parameters for the plurality of neurons.

Example 81 may include the subject matter of example 80, where the parameters include one or more of a firing potential threshold, a synaptic decay time constant, a membrane potential decay time constant, and a bias current.

Example 82 may include the subject matter of any one of examples 72-81, where the numerical matrix includes a sparse matrix.

Example 83 may include the subject matter of any one of examples 72-82, where the particular SNN includes a first set of the plurality of neurons, and each of the first set of neurons is recurrently connected with other neurons in the first set using a first set of the plurality of synapses.

Example 84 may include the subject matter of example 83, where the equation includes $a_2=WI_1$, where W includes the one or more matrices, l includes the input vector, and a includes a vector corresponding to the spiking rate values determined for at least the portion of the plurality of artificial neurons in the steady state condition.

Example 85 may include the subject matter of any one of examples 83-84, where the first set of the plurality of neurons includes a first subset of the plurality of neurons, the first set of the plurality of synapses includes a first subset of the plurality of synapses, the particular SNN includes a second subset of the plurality of neurons, the neurons in the second subset of neurons are feedforward connected to the neurons in the first subset through a second subset of the plurality of synapses, and the neurons in the second subset is recurrently connected with other neurons in the second subset using a third subset of the plurality of synapses.

Example 86 may include the subject matter of example 85, where the equation includes $r=C^{-1}BA^{-1}y$, where A includes a first one of the one or more matrices, B includes a second one of the one or more matrices, C includes a third one of the one or more matrices, y includes the input vector, r includes a vector corresponding to the spiking rate values determined for neurons in the second subset of neurons in the steady state condition, weight values of synapses in the first subset of synapses correspond to values of matrix A, weight values of synapses in the second subset of synapses correspond to values of matrix B, and weight values of synapses in the third subset of synapses correspond to values of matrix C.

Example 87 may include the subject matter of any one of examples 83-86, where the first set of the plurality of neurons includes a first subset of the plurality of neurons, the first set of the plurality of synapses includes a first subset of the plurality of synapses, the particular SNN includes a second subset of the plurality of neurons, each of the neurons in the second subset of neurons is feedforward connected to each of the neurons in the first subset through a second subset of the plurality of synapses, and each of the neurons in the second subset is recurrently connected with other neurons in the second subset using a third subset of the plurality of synapses.

Example 88 may include the subject matter of example 87, where the equation includes $r=C^{-1}BA^{-1}y$, where A includes a first one of the one or more matrices, B includes a second one of the one or more matrices, C includes a third one of the one or more matrices, y includes the input vector, r includes a vector corresponding to the spiking rate values determined for neurons in the second subset of neurons in the steady state condition, weight values of synapses in the first subset of synapses correspond to values of matrix A, weight values of synapses in the second subset of synapses correspond to values of matrix B, and weight values of synapses in the third subset of synapses correspond to values of matrix C.

Example 89 is a system including: a neuromorphic computing device including one or more routers, and a plurality of neuromorphic cores interconnected by the one or more routers. Each neuromorphic core in the plurality includes: a processor; a memory to store one or more routing tables; and logic to implement one or more artificial neurons to be hosted by the neuromorphic core, where each of the artificial neurons includes a respective dendrite process and a respective soma process to be executed using the processor, and state information for each of the artificial neurons is to be stored in the memory, where the one or more routing tables define synapses to interconnect the artificial neurons to define a particular spiking neural network (SNN) including the artificial neurons, the particular SNN is defined to correspond to a particular equation including inversion of a particular one of one or more numerical matrices and multiplication of a particular vector with the one or more matrices, each of the plurality of artificial synapses has a respective weight value based on values in the one or more numerical matrices. The system may further include an input source to provide an input with values corresponding to values in the particular vector to the particular SNN, and a spike rate calculator to determine, in a steady state of the particular SNN, spiking rates of a particular portion of the artificial neurons to represent an approximate solution to the equation.

Example 90 may include the subject matter of example 89, further including another device including: a processor; a memory; and solver logic to perform a particular iterative solver algorithm, where the solver logic is further to receive the approximate solution, perform the particular iterative solver algorithm using the approximate solution in an initial iteration of the particular iterative solver algorithm, and determine a solution to the equation.

Example 91 may include the subject matter of any one of examples 89-90, where the number of neurons in the plurality of neurons is based on dimensions of a particular one of the numerical matrices, and the number of inputs corresponds to a dimension of the numerical vector.

Example 92 may include the subject matter of example 89, where the neuromorphic cores time multiplex access to the processing resources of the respective neuromorphic core to concurrently implement the two or more artificial neurons.

Example 93 may include the subject matter of example 89, where the neuromorphic computing device includes an interface to accept programming inputs to configure the network of neuromorphic cores to implement any one of a plurality of different spiking neural networks including the particular SNN.

Example 94 may include the subject matter of any one of examples 89-97, where defining the particular SNN includes generating the plurality of neurons, defining the one or more routing tables, setting the weight values of the plurality of artificial synapses, and setting values of parameters for the plurality of neurons.

Example 95 may include the subject matter of example 94, where the parameters include one or more of a firing potential threshold, a synaptic decay time constant, a membrane potential decay time constant, and a bias current.

Example 96 may include the subject matter of any one of examples 89-95, where the numerical matrix includes a sparse matrix.

Example 97 may include the subject matter of any one of examples 89-96, where the particular SNN includes a first set of the plurality of neurons, and each of the first set of neurons is recurrently connected with other neurons in the first set using a first set of the plurality of synapses.

Example 98 The storage medium of Claim 97, where the equation includes $a_2=WI_1$, where W includes the one or more matrices, l includes the input vector, and a includes a vector corresponding to the spiking rate values determined for at least the portion of the plurality of artificial neurons in the steady state condition.

Example 99 may include the subject matter of any one of examples 97-98, where the first set of the plurality of neurons includes a first subset of the plurality of neurons, the first set of the plurality of synapses includes a first subset of the plurality of synapses, the particular SNN includes a second subset of the plurality of neurons, the neurons in the second subset of neurons are feedforward connected to the neurons in the first subset through a second subset of the plurality of synapses, and the neurons in the second subset is recurrently connected with other neurons in the second subset using a third subset of the plurality of synapses.

Example 100 may include the subject matter of example 99, where the equation includes $r=C^{-1}BA^{-1}y$, where A includes a first one of the one or more matrices, B includes a second one of the one or more matrices, C includes a third one of the one or more matrices, y includes the input vector, r includes a vector corresponding to the spiking rate values determined for neurons in the second subset of neurons in the steady state condition, weight values of synapses in the first subset of synapses correspond to values of matrix A, weight values of synapses in the second subset of synapses correspond to values of matrix B, and weight values of synapses in the third subset of synapses correspond to values of matrix C.

Example 101 may include the subject matter of any one of examples 97-100, where the first set of the plurality of neurons includes a first subset of the plurality of neurons, the first set of the plurality of synapses includes a first subset of the plurality of synapses, the particular SNN includes a second subset of the plurality of neurons, each of the neurons in the second subset of neurons is feedforward connected to each of the neurons in the first subset through a second subset of the plurality of synapses, and each of the neurons in the second subset is recurrently connected with other neurons in the second subset using a third subset of the plurality of synapses.

Example 102 may include the subject matter of example 101, where the equation includes $r=C^{-1}BA^{-1}y$, where A includes a first one of the one or more matrices, B includes a second one of the one or more matrices, C includes a third one of the one or more matrices, y includes the input vector, r includes a vector corresponding to the spiking rate values determined for neurons in the second subset of neurons in the steady state condition, weight values of synapses in the first subset of synapses correspond to values of matrix A, weight values of synapses in the second subset of synapses correspond to values of matrix B, and weight values of synapses in the third subset of synapses correspond to values of matrix C.

Example 103 may include the subject matter of example 89, where one or both of the input source and the spike rate calculator are implemented on the neuromorphic computing device.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, wherein the instructions when executed on a machine, cause the machine to:

define, using one or more routing tables, a particular spiking neural network (SNN) comprising a plurality of artificial neurons interconnected by a plurality of artificial synapses, wherein the particular SNN is defined to correspond to one or more numerical matrices in an equation, each of the plurality of artificial synapses comprises a respective weight value, and the weight values of the plurality of artificial synapses correspond to values in the one or more numerical matrices, wherein the particular SNN comprises a first subset of the plurality of neurons, and each of the first subset of neurons is recurrently connected with other neurons in the first subset using a first subset of the plurality of synapses;

provide, to the particular SNN, a plurality of inputs, wherein the plurality of inputs are selected to correspond to a numerical vector in the equation, and the plurality of inputs are provided to trigger solution of the equation using the particular SNN;

determine a spiking rate for at least a portion of the plurality of artificial neurons based on the plurality of inputs;

determine a steady state condition for the particular SNN; and determine an approximate result for the equation based on the spiking rate values determined for at least the portion of the plurality of artificial neurons in the steady state condition, wherein the equation comprises multiplication of an inverse of at least one of the numerical matrices, and the equation comprises $a=WI$ where W comprises the one or more matrices, I comprises the input vector, and a comprises a vector corresponding to the spiking rate values determined for at least the portion of the plurality of artificial neurons in the steady state condition.

2. The storage medium of claim 1, wherein the number of neurons in the plurality of neurons is based on dimensions of a particular one of the numerical matrices, and the number of inputs corresponds to a dimension of the numerical vector.

3. The storage medium of claim 1, wherein the particular SNN is implemented using a neuromorphic computing device comprising a network of neuromorphic cores.

4. The storage medium of claim 3, wherein the network of neuromorphic cores comprises:

a plurality of neuromorphic cores, wherein each neuromorphic core in the plurality of neuromorphic cores comprises a respective processing resource and logic to implement one or more artificial neurons;

one or more routers to route spiking messages between artificial neurons implemented using the plurality of neuromorphic cores; and memory comprising data to define interconnections of the plurality of artificial neurons in the particular SNN.

5. The storage medium of claim 4, wherein the data comprises:

the one or more routing tables to define connections between the plurality of artificial neurons corresponding to the plurality of artificial synapses; and the weight values assigned to each of the plurality of artificial synapses.

6. The storage medium of claim 4, wherein each neuromorphic core is to implement two or more of the plurality of artificial neurons.

7. The storage medium of claim 6, wherein the neuromorphic cores time multiplex access to the processing resources of the respective neuromorphic core to concurrently implement the two or more artificial neurons.

8. The storage medium of claim 3, wherein the neuromorphic computing device comprises an interface to accept programming inputs to configure the network of neuromorphic cores to implement any one of a plurality of different spiking neural networks including the particular SNN.

9. The storage medium of claim 1, wherein defining the particular SNN comprises generating the plurality of neurons, defining the one or more routing tables, setting the weight values of the plurality of artificial synapses, and setting values of parameters for the plurality of neurons.

10. The storage medium of claim 9, wherein the parameters comprise one or more of a firing potential threshold, a synaptic decay time constant, a membrane potential decay time constant, and a bias current.

11. The storage medium of claim 1, wherein the numerical matrix comprises a sparse matrix.

12. A method comprising:
receiving one or more inputs to define a particular spiking neural network (SNN), wherein the particular SNN is defined to correspond to one or more numerical matrices in an equation, definition of the particular SNN comprises definition of a number of digital artificial neurons to be implemented by a neuromorphic computing device, definition of a routing table to define a plurality of artificial synapses corresponding to interconnections of the number of neurons in the particular SNN, and definition of weight values for each of the plurality of synapses, wherein the weight values of the plurality of synapses correspond to values in the one or more numerical matrices, the particular SNN comprises a first subset of the number of neurons, and each of the first subset of neurons is recurrently connected with other neurons in the first subset using a first subset of the plurality of synapses;
generating the particular SNN on the neuromorphic computing device based on the one or more inputs;
receiving an input to the particular SNN comprising a vector, wherein the vector corresponds to a numerical vector I in the equation;
running the particular SNN based on the input, wherein the input is trigger solution of the equation using the particular SNN;
determining a steady state condition of the particular SNN;
determining spiking rate values for at least a portion of the plurality of artificial neurons based on the plurality of inputs; and
determining an approximate result for the equation based on the spiking rate values of the portion of the plurality of artificial neurons in the steady state condition, wherein the equation comprises multiplication of the particular vector with an inverse of at least one of the numerical matrices, and the equation comprises a=WI where W comprises the one or more matrices, I comprises the numerical vector, and a comprises a vector corresponding to the spiking rate values determined for at least the portion of the number of neurons in the steady state condition.

13. A system comprising:
a neuromorphic computing device comprising:
one or more routers;
a plurality of neuromorphic cores interconnected by the one or more routers, wherein each neuromorphic core in the plurality comprises:
a processor;
a memory to store one or more routing tables; and
logic to implement one or more artificial neurons to be hosted by the neuromorphic core, wherein each of the artificial neurons comprises a respective dendrite process and a respective soma process to be executed using the processor, and state information for each of the artificial neurons is to be stored in the memory,
wherein the one or more routing tables define synapses to interconnect the artificial neurons to define a particular spiking neural network (SNN) comprising the artificial neurons, the particular SNN is defined to correspond to a particular equation comprising inversion of a particular one of one or more numerical matrices and multiplication of a particular vector with the one or more matrices, each of the plurality of artificial synapses has a respective weight value based on values in the one or more numerical matrices;
an input source to provide an input with values corresponding to values in the particular vector to the particular SNN;
a spike rate calculator to determine, in a steady state of the particular SNN, spiking rates of a particular portion of the artificial neurons to represent an approximate solution to the particular equation based on the input; and
a solver configured to perform a particular iterative solver algorithm, wherein the solver logic is further to:
perform the particular iterative solver algorithm using the approximate solution in an initial iteration of the particular iterative solver algorithm; and
determine a solution to the equation using the particular iterative solver algorithm.

* * * * *